United States Patent
Johnson et al.

(10) Patent No.: US 11,614,954 B2
(45) Date of Patent: Mar. 28, 2023

(54) GRAPHICAL USER INTERFACE TO SPECIFY AN INTENT-BASED DATA MANAGEMENT PLAN

(71) Applicant: Cohesity, Inc., San Jose, CA (US)

(72) Inventors: Colin Scott Johnson, San Francisco, CA (US); Karandeep Singh Chawla, Santa Clara, CA (US); Chinmaya Manjunath, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/115,230

(22) Filed: Dec. 8, 2020

(65) Prior Publication Data

US 2022/0179664 A1    Jun. 9, 2022

(51) Int. Cl.
*G06F 9/451*    (2018.01)

(52) U.S. Cl.
CPC .................. *G06F 9/451* (2018.02)

(58) Field of Classification Search
CPC ..................................... G06F 9/451
See application file for complete search history.

(56) References Cited

U.S. PATENT DOCUMENTS

| | | | |
|---|---|---|---|
| 7,421,648 B1 * | 9/2008 | Davis | G06F 40/18 715/234 |
| 7,437,764 B1 | 10/2008 | Sobel | |
| 8,020,037 B1 * | 9/2011 | Schwartz | G06F 11/2094 714/6.3 |
| 8,086,585 B1 | 12/2011 | Brashers | |
| 8,112,661 B1 * | 2/2012 | La France | G06F 11/2069 714/5.1 |
| 8,190,583 B1 * | 5/2012 | Shekar | H04L 67/1097 707/688 |
| 8,312,471 B2 | 11/2012 | Davis | |
| 8,364,648 B1 * | 1/2013 | Sim-Tang | G06F 16/20 707/674 |
| 8,607,342 B1 | 12/2013 | Liao | |

(Continued)

OTHER PUBLICATIONS

Actifio. "Getting Started with Actifio VDP." Sep. 23, 2020. https://web.archive.org/web/20200923181125/https://docs.actifio.com/10.0/PDFs/Introducing.pdf (Year: 2020).*

(Continued)

*Primary Examiner* — Kieu D Vu
*Assistant Examiner* — Alvaro R Calderon, IV
(74) *Attorney, Agent, or Firm* — Van Pelt, Yi & James LLP

(57) ABSTRACT

An indication of an instantiation of a first graphical user interface item representing a first data pool component being specified to be included in a data pool is received. An indication of an instantiation of a second graphical user interface item representing a second data pool component being specified to be included in the data pool is received. The second graphical user interface item is graphically instantiated as connected with the first graphical user interface item to indicate that the first data pool component and the second data pool component belong to the same data pool able to be referenced as a combined single data entity. An indication of an instantiation of a third graphical user interface item representing a data management action to be applied to the data pool, wherein the third graphical user interface item is graphically instantiated as connected with a graphical representation of the data pool is received.

16 Claims, 31 Drawing Sheets

(56) References Cited

U.S. PATENT DOCUMENTS

| | | |
|---|---|---|
| 9,268,689 B1 | 2/2016 | Chen |
| 9,304,864 B1 | 4/2016 | Bushman |
| 9,311,190 B1 | 4/2016 | Bushman |
| 9,361,185 B1 | 6/2016 | Bushman |
| 9,471,441 B1 | 10/2016 | Lyadvinsky |
| 9,594,514 B1* | 3/2017 | Bono ................ G06F 3/0605 |
| 9,621,428 B1* | 4/2017 | Lev .................. H04L 41/12 |
| 9,983,812 B1 | 5/2018 | Don |
| 10,037,223 B2 | 7/2018 | Park |
| 10,089,148 B1 | 10/2018 | Blitzer |
| 10,162,528 B2 | 12/2018 | Sancheti |
| 10,169,077 B1* | 1/2019 | Sigl, Sr. ............ G06F 9/453 |
| 10,175,896 B2 | 1/2019 | Battaje |
| 10,275,321 B1 | 4/2019 | Bajaj |
| 10,496,497 B1 | 12/2019 | Yadav |
| 10,503,612 B1 | 12/2019 | Wang |
| 10,545,776 B1 | 1/2020 | Kowalski |
| 10,877,928 B2 | 12/2020 | Nagrale |
| 10,896,097 B1 | 1/2021 | Purcell |
| 11,036,594 B1* | 6/2021 | Shats ............... G06F 16/1873 |
| 11,176,154 B1* | 11/2021 | Dasgupta ........... G06K 9/6253 |
| 2003/0033344 A1 | 2/2003 | Abbott |
| 2004/0250033 A1 | 12/2004 | Prahlad |
| 2006/0069861 A1* | 3/2006 | Amano ............. G06F 11/1456 711/114 |
| 2006/0182255 A1 | 8/2006 | Luck, Jr. |
| 2007/0153675 A1 | 7/2007 | Baglin |
| 2008/0208926 A1* | 8/2008 | Smoot ............... G06F 16/217 |
| 2009/0089657 A1* | 4/2009 | Davis ................ G06F 16/94 715/234 |
| 2009/0171707 A1* | 7/2009 | Bobak ............... G06Q 10/06 705/7.23 |
| 2009/0313503 A1* | 12/2009 | Atluri ................ G06F 11/1461 714/E11.023 |
| 2010/0031170 A1* | 2/2010 | Carullo ............... G06F 16/58 715/762 |
| 2010/0070725 A1 | 3/2010 | Prahlad |
| 2010/0106933 A1* | 4/2010 | Kamila .............. H04L 43/16 711/171 |
| 2010/0122248 A1 | 5/2010 | Robinson |
| 2011/0022879 A1* | 1/2011 | Chavda ............. G06F 11/0793 714/1 |
| 2011/0106776 A1* | 5/2011 | Vik .................... G06F 9/451 707/698 |
| 2011/0107246 A1* | 5/2011 | Vik .................... G06F 9/451 715/771 |
| 2012/0203742 A1* | 8/2012 | Goodman .......... G06F 11/1469 707/649 |
| 2013/0006943 A1* | 1/2013 | Chavda ............. G06F 11/1464 707/E17.007 |
| 2013/0179481 A1 | 7/2013 | Halevy |
| 2013/0191347 A1 | 7/2013 | Bensinger |
| 2013/0219135 A1 | 8/2013 | Knowles |
| 2013/0227558 A1* | 8/2013 | Du .................... H04L 67/18 718/1 |
| 2013/0232480 A1* | 9/2013 | Winterfeldt ......... G06F 8/60 717/177 |
| 2013/0232497 A1* | 9/2013 | Alagam ............. G06F 8/61 718/104 |
| 2013/0254402 A1* | 9/2013 | Vibhor .............. G06F 9/5072 709/226 |
| 2013/0322335 A1 | 12/2013 | Smith |
| 2014/0040206 A1* | 2/2014 | Ramakrishnan .... G06F 11/2097 707/674 |
| 2014/0052692 A1 | 2/2014 | Zhang |
| 2014/0059306 A1 | 2/2014 | Bender |
| 2014/0165060 A1* | 6/2014 | Muller ............... G06F 9/5022 718/1 |
| 2014/0297588 A1* | 10/2014 | Babashetty ......... G06F 11/3027 707/613 |
| 2014/0359229 A1 | 12/2014 | Cota-Robles |
| 2014/0372553 A1 | 12/2014 | Blackburn |
| 2015/0193487 A1 | 7/2015 | Demidov |
| 2015/0254150 A1 | 9/2015 | Gordon |
| 2015/0278046 A1 | 10/2015 | Zellermayer |
| 2015/0347242 A1 | 12/2015 | Martos |
| 2015/0363270 A1* | 12/2015 | Hammer .............. G06F 16/128 711/162 |
| 2015/0370502 A1 | 12/2015 | Aron |
| 2015/0378765 A1* | 12/2015 | Singh ................. G06F 9/50 718/1 |
| 2016/0004450 A1* | 1/2016 | Lakshman ........... G06F 3/0664 711/162 |
| 2016/0034356 A1 | 2/2016 | Aron |
| 2016/0048408 A1* | 2/2016 | Madhu ................ H04L 47/783 718/1 |
| 2016/0070714 A1 | 3/2016 | D Sa |
| 2016/0085636 A1 | 3/2016 | Dornemann |
| 2016/0125059 A1 | 5/2016 | Jain |
| 2016/0162378 A1* | 6/2016 | Garlapati ........... G06F 11/2038 714/4.12 |
| 2016/0188898 A1* | 6/2016 | Karinta ............... G06F 11/1471 726/4 |
| 2016/0203060 A1* | 7/2016 | Singh ................. G06F 11/1469 714/19 |
| 2016/0232061 A1 | 8/2016 | Gaschler |
| 2016/0321339 A1* | 11/2016 | Tekade ............... G06F 8/76 |
| 2016/0357640 A1 | 12/2016 | Bushman |
| 2016/0357641 A1 | 12/2016 | Bushman |
| 2016/0357769 A1 | 12/2016 | Bushman |
| 2017/0031613 A1* | 2/2017 | Lee .................... G06F 3/065 |
| 2017/0031622 A1* | 2/2017 | Nagarajan ........... G06F 3/0607 |
| 2017/0060710 A1 | 3/2017 | Ramani |
| 2017/0060884 A1* | 3/2017 | Goodman ........... G06F 11/1464 |
| 2017/0123935 A1 | 5/2017 | Pandit |
| 2017/0168903 A1* | 6/2017 | Dornemann ........ G06F 11/2038 |
| 2017/0185491 A1 | 6/2017 | Hajare |
| 2017/0185729 A1 | 6/2017 | Boray |
| 2017/0193116 A1* | 7/2017 | Wong ................. G06F 16/2428 |
| 2017/0206212 A1 | 7/2017 | Srivilliputtur Mannarswamy |
| 2017/0212680 A1 | 7/2017 | Waghulde |
| 2017/0337109 A1* | 11/2017 | Ramu ................ G06F 11/1448 |
| 2018/0004437 A1 | 1/2018 | Battaje |
| 2018/0004764 A1 | 1/2018 | Sudarsanam |
| 2018/0060106 A1* | 3/2018 | Madtha .............. H04L 41/12 |
| 2018/0060187 A1* | 3/2018 | Chavda ............. G06F 11/1448 |
| 2018/0081766 A1* | 3/2018 | Ghuge ............... G06F 11/1662 |
| 2018/0081902 A1* | 3/2018 | McKenzie ......... G06Q 10/06316 |
| 2018/0088973 A1 | 3/2018 | Subhraveti |
| 2018/0113625 A1 | 4/2018 | Sancheti |
| 2018/0196820 A1* | 7/2018 | Kremer ............... G06F 3/0667 |
| 2018/0212896 A1 | 7/2018 | Chang |
| 2018/0253414 A1* | 9/2018 | Hailpern ............. G09G 5/20 |
| 2018/0293374 A1 | 10/2018 | Chen |
| 2018/0316577 A1 | 11/2018 | Freeman |
| 2018/0329637 A1 | 11/2018 | Battaje |
| 2019/0065277 A1* | 2/2019 | Raikov ............... H04L 41/0806 |
| 2019/0073276 A1* | 3/2019 | Yuen .................. G06F 11/302 |
| 2019/0108266 A1* | 4/2019 | Manvar .............. G06F 11/1464 |
| 2019/0129799 A1 | 5/2019 | Kumarasamy |
| 2019/0132203 A1* | 5/2019 | Wince ................ G06F 16/215 |
| 2019/0197020 A1 | 6/2019 | Yap |
| 2019/0215358 A1 | 7/2019 | Kobayashi |
| 2019/0220198 A1 | 7/2019 | Kashi Visvanathan |
| 2019/0228097 A1* | 7/2019 | Kassa ................ G06F 11/3476 |
| 2019/0278662 A1 | 9/2019 | Nagrale |
| 2019/0278663 A1* | 9/2019 | Mehta ................ G06F 3/0649 |
| 2020/0026538 A1 | 1/2020 | Cui |
| 2020/0034254 A1* | 1/2020 | Natanzon ........... G06F 9/455 |
| 2020/0057567 A1* | 2/2020 | Hutcheson ......... G06F 9/45558 |
| 2020/0057669 A1* | 2/2020 | Hutcheson ......... G06F 3/0659 |
| 2020/0110755 A1* | 4/2020 | Waldman ........... G06F 9/451 |
| 2020/0159625 A1* | 5/2020 | Hutcheson ......... G06F 11/1461 |
| 2020/0167238 A1* | 5/2020 | Killamsetti |
| 2020/0183794 A1* | 6/2020 | Dwarampudi ...... G06F 11/1469 |
| 2020/0233571 A1* | 7/2020 | Yuravlivker ........ G06F 9/451 |
| 2020/0278274 A1 | 9/2020 | Shetty |
| 2020/0285449 A1* | 9/2020 | McIntosh ........... G06F 8/34 |
| 2020/0394072 A1* | 12/2020 | Sreekantaswamy ........... G06F 11/0793 |
| 2021/0056203 A1 | 2/2021 | Qiao |

(56) References Cited

U.S. PATENT DOCUMENTS

| | | | |
|---|---|---|---|
| 2021/0081087 A1* | 3/2021 | Wayne | G06F 3/0484 |
| 2021/0103556 A1 | 4/2021 | Nagrale | |
| 2021/0232579 A1* | 7/2021 | Schechter | G06F 16/2456 |
| 2021/0318851 A1* | 10/2021 | Sahu | G06F 16/2428 |
| 2021/0382771 A1* | 12/2021 | Schniebel | G06F 11/0793 |
| 2021/0385254 A1 | 12/2021 | Pettit | |
| 2022/0035714 A1* | 2/2022 | Schultz | G06F 11/3409 |

OTHER PUBLICATIONS

Grace, C. "Site Recovery Manager Technical Overview." Dec. 1, 2020. https://web.archive.org/web/20201201181602/https://core.vmware.com/resource/site-recovery-manager-technical-overview (Year: 2020).*

VMware. "Site Recovery Manager Evaluation Guide." Oct. 19, 2020. https://web.archive.org/web/20201019155135/https://core.vmware.com/resource/site-recovery-manager-evaluation-guide (Year: 2020).*

McLaughlin, M. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).*

Chuang, M. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).*

CloudEndure. "CloudEndure Documentation." Dec. 1, 2020. https://web.archive.org/web/20201201022045/https://docs.cloudendure.com/CloudEndure%20Documentation.htm (Year: 2020).*

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).*

Red Hat. "Red Hat Virtualization 4.3 Product Guide." Jul. 17, 2019. https://web.archive.org/web/20190717013254/https://access.redhat.com/documentation/en-us/red_hat_virtualization/4.3/html/product_guide/index (Year: 2019).*

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).*

VMware. "Site Recovery Manager Administration." May 31, 2019. https://docs.vmware.com/en/Site-Recovery-Manager/8.5/srm-admin-8-5.pdf (Year: 2019).*

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

"Backup Solution Guide"—Synology https://download.synology.com/download/www-res/brochure/backup_solution_guide_en-global.pdf (Year: 2019).

"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).

* cited by examiner

GRAPHICAL USER INTERFACE TO SPECIFY AN INTENT-BASED DATA MANAGEMENT PLAN

BACKGROUND OF THE INVENTION

A data management provider may provide a plurality of data management services, such as backup, restore, disaster recovery, replication, migration, analytics, compliance, security, etc. The data management provider may provide the data management services for a plurality of objects associated with an entity. Examples of objects include files, databases, virtual machines, applications, volumes, etc. An entity may correspond to a user, an individual, an enterprise, a government, a company, an organization, etc.

The plurality of objects associated with the entity may be stored in one or more datacenters associated with the entity and/or a cloud storage associated with the entity. A datacenter may include one or more storage systems, such as a source system and a backup system. Each time the data management provider performs one of the data management services, a user associated with the entity may need to directly specify one or more objects to which the data management service applies. This can be a cumbersome process when the data management provider performs the plurality of data management services with respect to a large number of objects within and/or across datacenters.

BRIEF DESCRIPTION OF THE DRAWINGS

Various embodiments of the invention are disclosed in the following detailed description and the accompanying drawings.

BRIEF SUMMARY OF THE INVENTION

Figure 1:
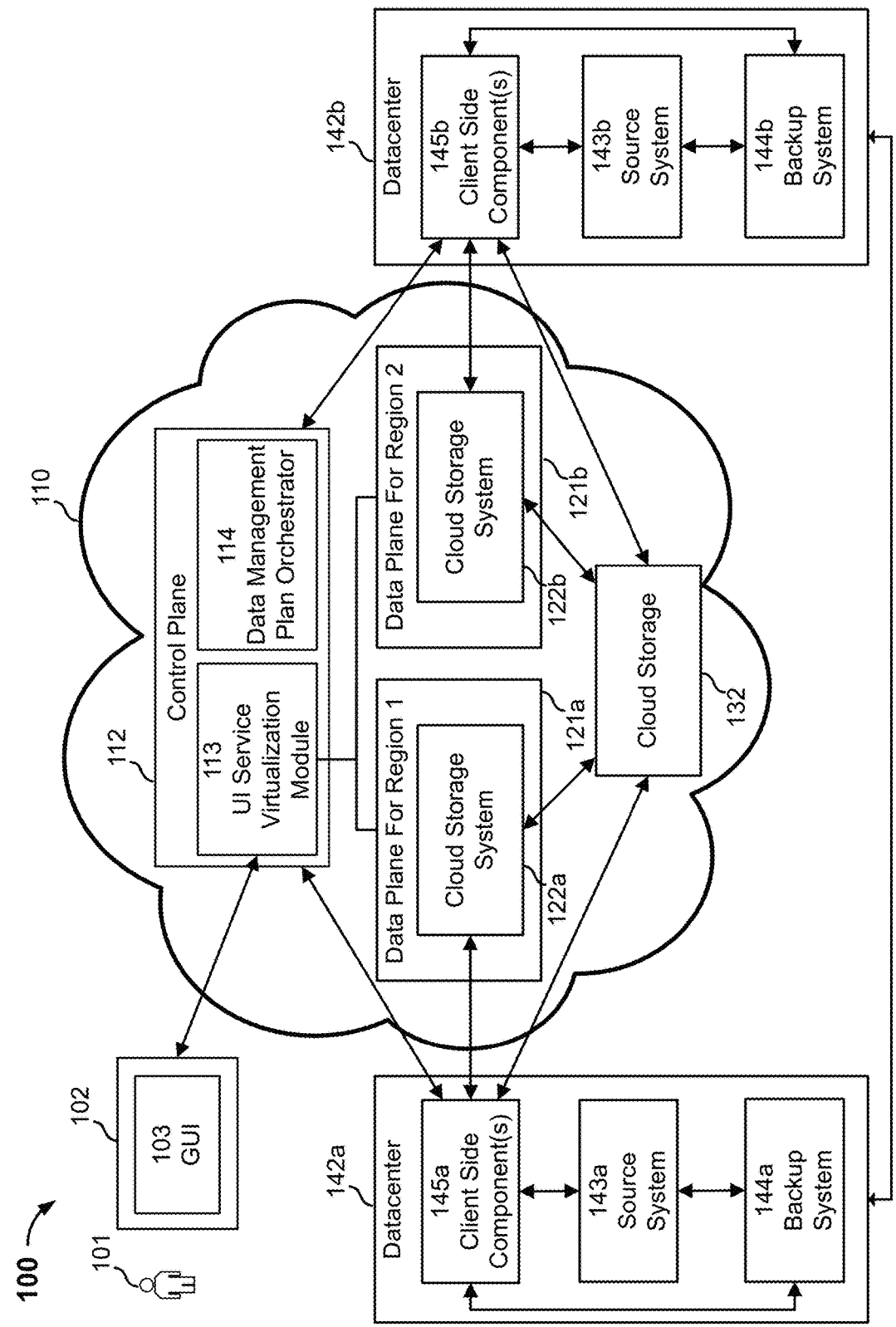
FIG. 1 is a block diagram illustrating a system for specifying an intent-based data management plan in accordance with some embodiments.

An illustrative method for specifying an intent-based data management plan includes receiving an indication of an instantiation of a first graphical user interface item representing a first data pool component being specified to be included in a data pool. The method also includes receiving an indication of an instantiation of a second graphical user interface item representing a second data pool component being specified to be included in the data pool, wherein the second graphical user interface item is graphically instantiated as connected with the first graphical user interface item to indicate that the first data pool component and the second data pool component belong to the same data pool able to be referenced as a combined single data entity. The method further includes receiving an indication of an instantiation of a third graphical user interface item representing a data management service to be applied to the data pool, wherein the third graphical user interface item is graphically instantiated as connected with a graphical representation of the data pool.

An illustrative computer program product for specifying an intent-based data management plan includes receiving an indication of an instantiation of a first graphical user interface item representing a first data pool component being specified to be included in a data pool. The computer program product also includes receiving an indication of an instantiation of a second graphical user interface item representing a second data pool component being specified to be included in the data pool, wherein the second graphical user interface item is graphically instantiated as connected with the first graphical user interface item to indicate that the first data pool component and the second data pool component belong to the same data pool able to be referenced as a combined single data entity. The computer program product further includes receiving an indication of an instantiation of a third graphical user interface item representing a data management service to be applied to the data pool, wherein the third graphical user interface item is graphically instantiated as connected with a graphical representation of the data pool.

An illustrative system for specifying an intent-based data management plan includes a memory and a processor. The processor is configured to receive an indication of an instantiation of a first graphical user interface item representing a first data pool component being specified to be included in a data pool. The processor is also configured to receive an indication of an instantiation of a second graphical user interface item representing a second data pool component being specified to be included in the data pool, wherein the second graphical user interface item is graphically instantiated as connected with the first graphical user interface item to indicate that the first data pool component and the second data pool component belong to the same data pool able to be referenced as a combined single data entity. The processor is further configured to receive an indication of an instantiation of a third graphical user interface item representing a data management service to be applied to the data pool, wherein the third graphical user interface item is graphically instantiated as connected with a graphical representation of the data pool.

DETAILED DESCRIPTION

A graphical user interface that provides a user associated with an entity the ability to specify an intent-based data management plan is disclosed herein. An intent-based data management plan includes a data pool and one or more data management services that apply to the data pool. A data pool is a description of one or more objects to be included in the data pool when the one or more data management services are performed. The description may indirectly and/or directly identify the one or more objects. The one or more objects included in the data pool may change over time. For example, the description may be assessed immediately (e.g., as soon as the intent-based data management plan is validated, according a schedule, each time a data management service is performed, etc.).

A data pool is comprised of one or more data sets. A data set is comprised of one or more objects. Examples of objects include files, databases, virtual machine, applications, containers, volumes, etc. An object associated with the entity may be associated with one or more tags, labels, features, and/or prefixes. A tag, label, feature, or prefix may correspond to a file type, file extension, data type, location, storage tenant, creation date, file size, memory used, most recently updated timestamp, permission level, owner, projection job type, etc. The one or more objects that are to be included in the data pool when the one or more data management services are performed may be based on a tag, label, feature, and/or prefix associated with the one or more objects. The data pool may be a heterogeneous data pool that includes objects of different type. For example, the data pool may include a virtual machine and a database.

The one or more objects included in the data pool may change over time. Objects may be added or removed from a data pool. For example, a first set of objects may be included in the data pool when a first instance of a first management service is performed. The first management service may be performed for one or more objects having a first tag. After the first management service is performed, the first tag may be removed from one or more objects included in the first set of objects. A second set of objects may be included in the data pool when a second instance of the first management service is performed. The second set of objects may include the one or more objects that were included in the first set of objects that still have the first tag, but exclude the one or more objects that were included in the first set of objects, but no longer have the first tag.

The graphical user interface may enable the user to specify one or more objects to include in a data set based on one or more tags, labels, features, and/or prefixes. The graphical user interface provides a flexible approach to add one or more objects to a data set without having to explicitly identify, i.e., by name, the one or more objects to include in the data set. In some embodiments, a data set may dynamically expand as additional objects meet the data set specification (e.g., a shared tag associated with the data set is added to an object after the data set was created). In some embodiments, a data set may dynamically contract as fewer objects meet the data specification (e.g., a shared tag associated with the data set is removed from an object after the data set was created).

The graphical user interface may enable the user to specify the one or more data sets that are to be included in a data pool when the one or more data management services are performed. After the user has specified a data pool, the graphical user interface may enable the user to specify and configure one or more data management services that are to be applied to the specified data pool. For example, the user may specify a backup plan for the specified data pool, a restore plan for the specified data pool, a disaster recovery plan for the specified data pool, a replication plan for the specified data pool, a migration plan for the specified data pool, an analytics plan for the specified data pool, a compliance plan for the specified data pool, a file tiering plan for the specified data pool, a security plan (e.g., anti-virus scan) for the specified data pool, etc.

The graphical user interface face may enable the user to validate the intent-based data management plan. Upon being validated, the data management provider may cause the specified intent-based data management plan to be performed. The graphical user interface provides an abstraction layer on top of the data management services provided by the data management provider. This simplifies the process of establishing a data management plan for an entity. Instead of having to explicitly identify one or more objects to which a data management service applies, the graphical user interface enables a user to indirectly identify the one or more objects to which the data management service applies through the use of tags, labels, features, and/or prefixes. This reduces the amount of time needed to configure a data management service.

For example, a user may desire to configure a backup plan for a plurality of VMs. The plurality of VMs may be managed by different hypervisor managers, different types of hypervisor managers, etc. The VMs may have one or more tags shared between them. To configure the backup plan, the user may need to specify a frequency at which a backup is to occur (e.g., every day at 12 am), a source system, destination system, a type of backup (e.g., full backup, incremental backup, continuous data protection), etc. The user may desire to specify the same backup plan for the plurality of VMs. Other systems may require the user to specify a backup plan for $VM_1$, then a backup plan for $VM_2$, . . . , and finally a backup plan for $VM_n$. Using the graphical user interface disclosed herein, the user may specify a single backup plan that applies to $VM_1$, $VM_2$, $VM_n$ through the use of tags, labels, features, and/or prefixes.

The graphical user interface also provides flexibility in updating a data management plan. Other systems may require a user to reconfigure an existing data management service by manually updating the data management service. Continuing the above example, the user may desire to remove $VM_2$ from the backup plan. Other systems may require the user to manually remove $VM_2$ from a list of VMs to which the backup plan applies. For each data management service that no longer applies to $VM_2$, the user may have to update each individual data management service (e.g., remove $VM_2$ from a corresponding list) so that the data management service no longer applies to $VM_2$. In contrast, a tag, label, feature, or prefix associated with $VM_2$ that associates $VM_2$ with one or more data management services may be modified or removed from $VM_2$ so that the one or more data management services no longer apply to $VM_2$. For example, the data set is based on the "owner" of the one or more objects. The "owner" associated with $VM_2$ may change such that the one or more data management services no longer apply to $VM_2$.

FIG. 1 is a block diagram illustrating a system for specifying an intent-based data management plan in accordance with some embodiments. In the example shown, system 100 enables user 101 to establish, via a graphical user interface 103 of user device 102, an intent-based data management plan for one or more datacenters.

User device 102 may be a computer, a desktop, a laptop, a smartphone, a tablet, or any other computing device with a graphical user interface. User device 102 is associated with user 101. User 101 may be associated with an entity, such as an individual, an enterprise, a government, a company, an organization, etc. The entity may store a plurality of objects in datacenters 142a, 142b. An object may correspond to a file, a database, a virtual machine, an application, a volume, etc. Although FIG. 1 depicts the entity being associated with two datacenters, an entity may be associated with one or more datacenters. In some embodiments, a datacenter is a hybrid or cloud-based datacenter.

A data management provider may establish a data management as a service (DMaaS) infrastructure in cloud environment 110 (e.g., public cloud, private cloud, hybrid cloud, etc.) provided by a cloud provider (e.g., Amazon Web Services™, Microsoft™ Azure, Google Cloud™, etc.). The DMaaS infrastructure may enable entities to remotely specify a data management plan for their data that is stored in one or more datacenters. The DMaaS infrastructure may include control plane 112 and one or more data planes, such as data planes 121a, 121b.

Control plane 112 is configured to manage the DMaaS infrastructure that enables users, such as user 101, to remotely access and manage one or more objects associated with an entity. Control plane 112 includes a user interface (UI) service virtualization module 113 (e.g., container, virtual machine, pod) that enables user device 102 to communicate with the DMaaS infrastructure. UI service virtualization module 113 may receive from device 102 via GUI 103 an indication of a specification of a data pool and an indication of a specification of a data management service to apply to the data pool. In response, UI service virtualization module 113 may provide the data pool specification and the data management service specification to data management plan orchestrator 114. The data pool specification and the data management service specification represent an intent of user 101. The data management service specification may include one or more data management plans corresponding to one or more data management services.

Data management plan orchestrator 114 may utilize the data pool specification and the data management service specification to achieve the intent of user 101. For example, the data pool specified by user 101 via GUI 103 may indicate that virtual machines having a particular tag at a particular location need a particular recovery point objective (RPO) and a particular recovery time objective (RTO). Data management plan orchestrator 114 may determine whether the intent of user 101 is able to be achieved. In the event the intent of user 101 is unable to be achieved or unlikely to be achieved due to actual, estimated, or forecasted resources and/or loads, data management plan orchestrator 114 may notify, via GUI 103 of device 102, user 101 that the intent is unable or unlikely to be achieved. In the event the intent of user 101 is able to be achieved, data management plan orchestrator 114 may orchestrate the datacenter components of system 100 that are needed to achieve the intent (e.g., client side components 145a, 145b, source systems 143a, 143b, backup systems 144a, 144b, cloud storage systems 122a, 122b, and/or cloud storage 132).

Control plane 112 may establish one or more data planes for an entity based on a location of the entity's datacenters. For example, datacenter 142a may be located at a first location (e.g., California) and datacenter 142b may be located at a second location (e.g., New York). The data management provider may establish data plane 121a for a first region (e.g., "West Coast") that includes the first location and data plane 121b for a second region (e.g., "East Coast") that includes the second location. A data plane may include one or more cloud storage systems that are each comprised of one or more cloud servers (e.g., EC2 instances). A data plane may be configured to control how data associated with an entity is stored in cloud storage system 122a, cloud storage system 122b, and/or cloud storage 132.

An entity may add one or more additional datacenters at corresponding locations and the one or more additional datacenters may be assigned to a data plane based on the corresponding locations of the one or more additional datacenters. For example, an entity may add an additional datacenter at a third location (e.g., Los Angeles or Washington D.C.) and the additional datacenter may be assigned to data plane 121a or data plane 121b based on the third location (e.g., Los Angeles is located on the "West Coast," Washington D.C. is located on the "East Coast"). The data management provider may also add additional data planes in the event datacenters associated with an entity expand across the world (e.g., Europe, Asia, etc.).

Datacenters 142a, 142b include corresponding source systems 143a, 143b. A source system may be a server, a virtual machine, a container, a database, etc. In some embodiments, a source system is coupled to a backup system. For example, source system 143a may be coupled to backup system 144a and source system 143b may be coupled to backup system 144b. In some embodiments, a datacenter does not include a backup system. In some embodiments, a datacenter is associated with a backup system, but the backup system is remote from the datacenter. Source systems 143a, 143b may be configured to receive from control plane 112 one or more commands to perform one or more data management services. For example, source systems 143a, 143b may receive one or more commands to perform a backup to backup systems 144a, 144b, respectively. Backup systems 144a, 144b may be configured to receive from control plane 112 one or more commands to perform one or more data management services. For example, backup systems 144a, 144b may receive one or more commands to perform an anti-virus scan on objects having a particular label, tag, and/or prefix.

Datacenters 142a, 142b include corresponding client side component(s) 145a, 145b. The one or more client side components 145a, 145b are configured to receive from control plane 112 one or more commands to perform one or more data management services. For example, the one or more client side components 145a, 145b may receive one or more commands to back up content from corresponding source systems 143a, 143b and/or corresponding backup systems 144a, 144b to cloud storage 132 (e.g., Amazon Simple Storage Service (S3)). Client side components 145a, 145b may receive one or more commands to replicate objects having a particular tag to datacenters 142a, 142b, respectively. Client side components 145a, 145b may receive one or more commands to cause an object having a particular tag that is hosted on source systems 143a, 143b, respectively, to have a particular RPO and RTO.

A client side component, such as client side components 145a, 145b may backup to cloud storage 132 data associated with a source system, such as source systems 143a, 143b, or data associated with a backup system, such as backup systems 144a, 144b. A cloud storage system, such as cloud storage systems 122a, 122b, may generate metadata for the data that is stored at cloud storage 132. In some embodiments, a cloud storage system, such as cloud storage systems 122a, 122b, may store the generated metadata at cloud storage 132.

User 101 may specify an intent-based data management plan via GUI 103 of user device 102. In some embodiments, GUI 103 is part of an application running on user device 102. In some embodiments, GUI 103 is a plugin running in a web browser. In some embodiments, GUI 103 is provided by a containerized-application running on user device 102. GUI 103 is configured to present a plurality of building blocks that enable user 101 to specify the intent-based data management plan. The intent-based data management plan is comprised of a data pool and one or more data management services that are to be applied to one or more objects associated with the data pool. GUI 103 may enable user 101 to manipulate the plurality of building blocks in manner that graphically represents the user's intent-based data management plan.

A data pool includes one or more data sets. A data set is comprised of one or more objects. GUI 103 may enable user 101 to graphically specify which objects are to be included in the data set through the use of one or more of the building blocks. For example, GUI 103 may display a plurality of building blocks for specifying a data set. GUI 103 may enable user 101 to perform a series of "drag and drop" operations of the plurality of building blocks to specify the data set. A data set specified by user 101 may include any combination of the building blocks available for specifying a data set. GUI 103 may enable the data set specified by user 101 to be included in a data pool specified by user 101.

The plurality of building blocks for specifying a data set may include a graphical user interface item that enables user 101 to specify a data set to be included in a data pool. The graphical user interface item may enable user 101 to name the data set.

The plurality of building blocks for specifying a data set may include a graphical user interface item that enables user 101 to specify a location associated with objects to be included in the data set. Objects that are not associated with the specified location may be excluded from the data set.

The plurality of building blocks for specifying a data set may include a graphical user interface item that enables user 101 to specify a data source for objects to be included in the data set. The objects that are included in the data set may be limited based on a data type associated with the object. For example, the data set may be limited to VMs and exclude objects of other data types (e.g., databases).

The plurality of building blocks for specifying a data set may include a graphical user interface item that enables user 101 to manually select objects to be included in the data set. The graphical user interface provides a flexible approach to add one or more objects to a data set without having to explicitly identify, (e.g., by name), the one or more objects to be included in the data set. However, the graphical user interface provides a user the ability to include one or more objects by name.

The plurality of building blocks for specifying a data set may include a graphical user interface item that enables user 101 to specify objects to be included in the data set by a tag, a label, feature, and/or a prefix. For example, user 101 may specify that objects with a tag are included in the data set.

The plurality of building blocks for specifying a data set may include a graphical user interface item that enables user 101 to specify a rule for adding objects to the data set. For example, user 101 may specify a rule that objects included in the data set may not be transmitted outside a particular region. A disaster recovery plan may be established for a datacenter located in the United Kingdom. An entity may have a data center located in New York and Germany. The rule may indicate that objects located in the data set may not be transmitted outside of Europe. Thus, the data center located in Germany may be selected as a disaster recovery site while the data center located in New York may not be selected as a disaster recovery site. In another example, user 101 may specify a rule that VMs having certain criteria or properties (e.g., memory used is greater than a first threshold) are to be included in the data set. In the event a new VM is created and has the certain criteria or properties specified by the rule (e.g., the new VM uses more memory than the first threshold), the new VM may be automatically added to the data set.

The plurality of building blocks for specifying a data set may include a graphical user interface item that enables user 101 to add a rule operator for the data set. For example, user 101 may specify that objects created before a particular date are excluded from the data set.

After a data set has been finalized (e.g., saved), the data set may be available for selection to specify a data pool. GUI 103 may enable user 101 to specify which data sets to include in a data pool for an intent-based data management plan. An intent-based data management plan is comprised of a specified data pool and one or more data management services.

GUI 103 may enable user 101 to specify an intent-based data management plan through the use of a plurality of building blocks. GUI 103 may enable user 101 to perform a series of "drag and drop" operations to specify the intent-based data management plan. An intent-based data management plan specified by user 101 may include any combination of the building blocks available for specifying the intent-based data management plan.

The plurality of building blocks may include a graphical user interface item that enables user 101 to specify a primary site associated with a data management service. A primary site may correspond to a datacenter location associated with an entity.

The plurality of building blocks may include a graphical user interface item that enables user 101 to specify, if needed, a disaster recovery site associated with the data management service. The disaster recovery site may correspond to a datacenter associated with the entity that is different than the specified primary site.

The plurality of building blocks may include a graphical user interface item that enables user 101 to specify a data pool to which the data management service is to be applied. The data pool is comprised of one or more data sets. In the event user 101 adds a plurality of data sets to the data pool, the order in which the data management service is to be applied is based on a top-down order. In some embodiments, the order in which the data management service is to be applied is based on a bottom-up order. In some embodiments, the one or more data sets are analyzed to determine all of the objects included in the one or more data sets and the data management service is applied to the objects included in the one or more data sets independent of the object's membership in a data set.

The plurality of building blocks may include a graphical user interface item that enables user 101 to specify a target center associated with the data management service. In some embodiments, a target center corresponds to a data set, for example, the data set specified in FIGS. 2A-2I. In some embodiments, the target center corresponds to a server or virtual machine that is to receive data associated with one or more objects stored at the primary site. For example, the target center may correspond to a server or virtual machine that is to be used for restoration, migration, replication, continuous data protection, etc.

The plurality of building blocks may include a graphical user interface item that enables user 101 to specify a time delay associated with the data management service. The time delay may indicate an amount of time after the intent-based data management plan is validated before a data management service associated with the intent-based data management plan is performed.

In some embodiments, a time delay is specified for a data set included in a data pool. For example, a data management service may be applied to a first data set included in the data pool. The graphical user interface item that enables a user to specify a time delay associated with the data management service may enable the user to specify an amount of time before the data management service is applied to a second data set included in the data pool.

In some embodiments, a time delay is applied to a data pool. For example, after a specification of the intent-based data management plan is validated, the time delay may indicate an amount of time before one of the data management services included in the intent-based data management plan is to be applied to the data pool.

The plurality of building blocks may include a graphical user interface item that enables user 101 to specify a script associated with the data management service. For example, the script may be a script to validate that a target center has enough storage to perform the data management service, a script to check network connectivity to perform the data management service, etc.

The plurality of building blocks may include a graphical user interface item that enables user 101 to specify a protection profile associated with the data management service. The protection profile may indicate an RTO and/or an RPO associated with objects included in the specified data pool. The protection profile may indicate a frequency at which backups (e.g., continuous, hourly, daily, weekly, etc.) are to be performed for objects included in the specified data pool. The protection profile may indicate a type of backup (e.g., full backup, incremental backup, or CDP) that is to be performed for objects included in the specified data pool. The protection profile may indicate a frequency (e.g., one time, daily, weekly, etc.) at which a virus scan is performed on objects included in the specified data pool. The protection profile may indicate a storage tier for objects included in the specified data pool. A tier may be associated with a corresponding RPO, RTO, and/or input/output operations per second (TOPS).

GUI 103 may include a graphical user interface item that enables user 101 to validate the combination of building blocks that specify a data management plan for a data management service associated with the intent-based data management plan. In response to a selection of the graphical user interface item, user device 102 may send to control plane 112 data associated with the specified data management plan (e.g., disaster recovery plan) for the data management service. The data associated with the specified data management plan for the data management service is provided to data management plan orchestrator 114.

In some embodiments, data management plan orchestrator 114 validates the specified data management plan for the data management service. Data management plan orchestrator 114 may validate the specified data management plan by performing at least one of determining whether the inputs associated with the specified data management plan are correct, determining the network resources needed to implement the specified data management plan are sufficient, determining whether a specified resource (e.g., disaster recovery site system) needed to perform some or all of the data management plan is capable of performing as required by the specified data management plan (e.g., has enough storage, system resources, etc.), determining whether a service level agreement is able to be achieved (e.g., able to achieve a specified RPO and/or RTO), identifying the one or more datacenter components that are needed to achieve the intent, etc. In response to validating the specified data management plan, data management plan orchestrator 114 is configured to orchestrate the datacenter components that are needed to achieve the intent (e.g., client side components 145a, 145b, source systems 143a, 143b, backup systems 144a, 144b, cloud storage systems 122a, 122b, and/or cloud storage 132) by sending one or more commands to the one or more identified data center components to achieve the intent.

In some embodiments, data management plan orchestrator 114 does not validate the specified data management plan for a data management service. For example, user 101 may specify a particular RPO or RTO that neither backup systems 144a, 144b, cloud storage systems 122a, 122b, nor cloud storage 132 are able to achieve. In response to not validating the specified data management plan, data management plan orchestrator 114 is configured to provide GUI 103 a notification that the specified data management plan is unable or unlikely to be validated. In some embodiments, the notification includes one or more reasons indicating why the specified data management plan was unable or unlikely to be validated. In some embodiments, the notification includes one or more recommendations or modifications to the specified data management plan that may enable the specified data management plan for the data management service to be validated. For example, the notification may include a recommendation to change the particular RPO or RTO to a value that backup systems 144a, 144b, cloud storage systems 122a, 122b, or cloud storage 132 is able to achieve.

Figure 2A:
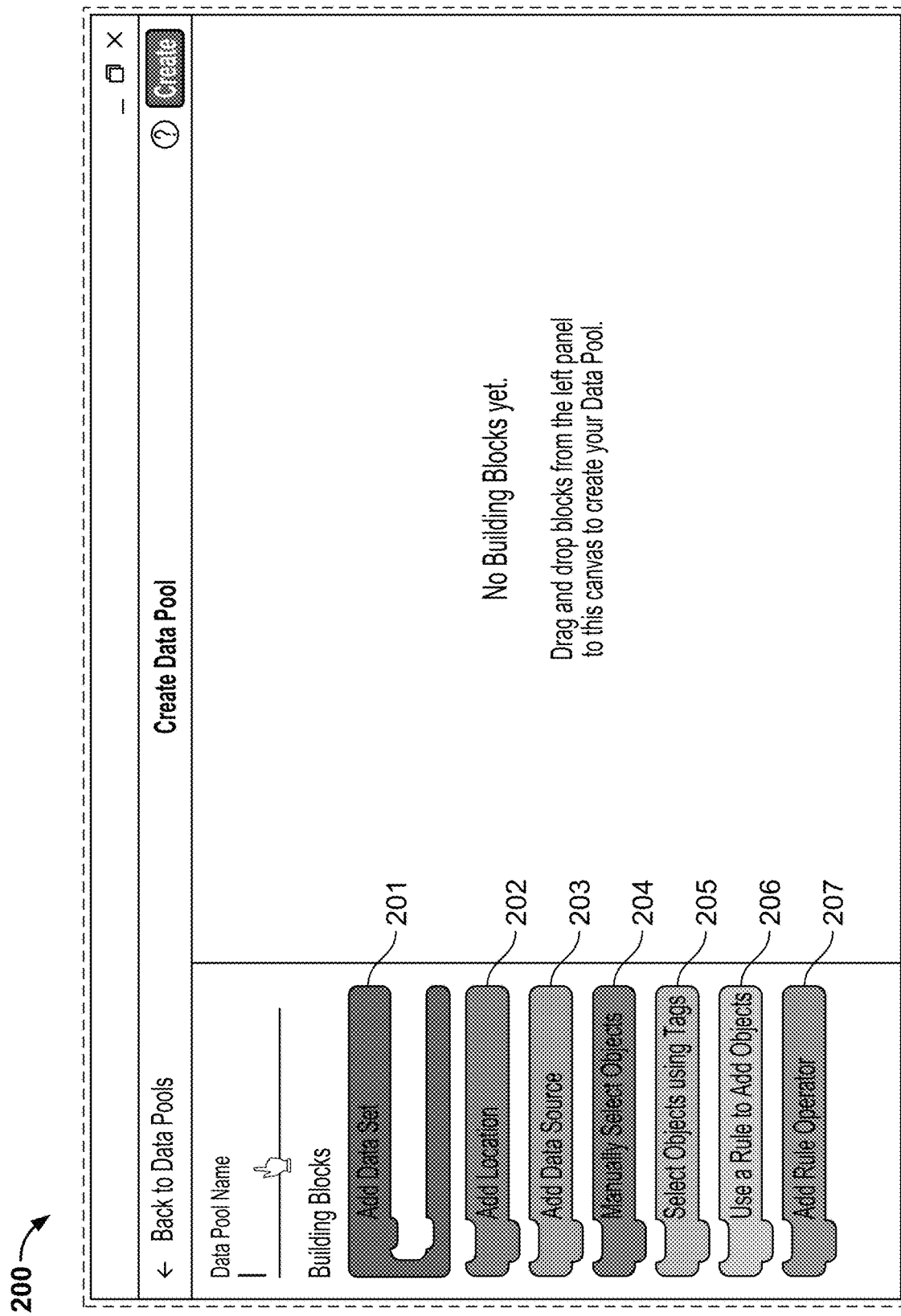
FIGS. 2A-2I illustrate examples of a graphical user interface in accordance with some embodiments.

FIGS. 2A-2I illustrate an example of using a graphical user interface to specify a data set for a data pool. FIG. 2A illustrates an example of a graphical user interface in accordance with some embodiments. In the example shown, graphical user interface 200 includes a plurality of building blocks. The plurality of data blocks are selectable graphical user interface items that may be used to specify one or more data sets that are to be included in a data pool.

The plurality of building blocks include graphical user interface item 201 that enables a user to specify a data set to be included in a data pool, graphical user interface item 202 that enables a user to specify a location associated with objects to be included in the data set, graphical user interface item 203 that enables a user to specify a data source for objects to be included in the data set, graphical user interface item 204 that enables a user to manually select objects to be included in the data set, graphical user interface item 205 that enables a user to specify objects to be included in the data set by a tag, graphical user interface item 206 that enables a user to specify a rule for adding objects to the data set, and graphical user interface item 207 that enables a user to add a rule operator for the data set. Each of the graphical user interface items may be referred to as a "data set component."

Figure 2B:
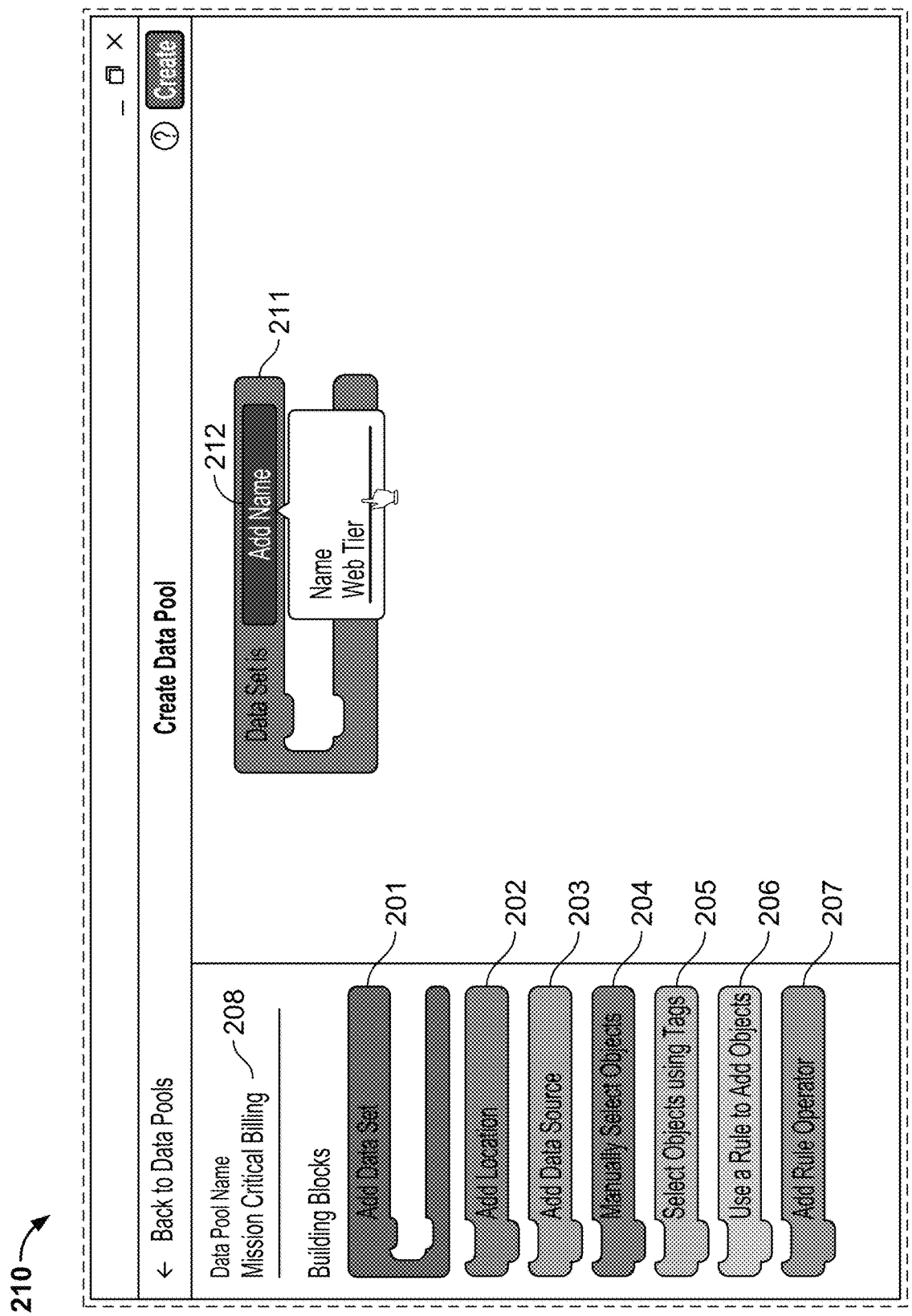

FIG. 2B illustrates an example of a graphical user interface in accordance with some embodiments. In the example shown, graphical user interface 210 has received an input 208 that indicates a name of the data pool is "Mission Critical Billing." Graphical user interface 210 has also received an instantiation of graphical user interface item 211. The instantiation of graphical user interface item 211 may occur when a user selects graphical user interface item 201 and performs a "drag and drop" operation with respect to graphical user interface 210. Graphical user interface 210 has received an input 212 that indicates a name of the data set is "Web Tier."

Figure 2C:
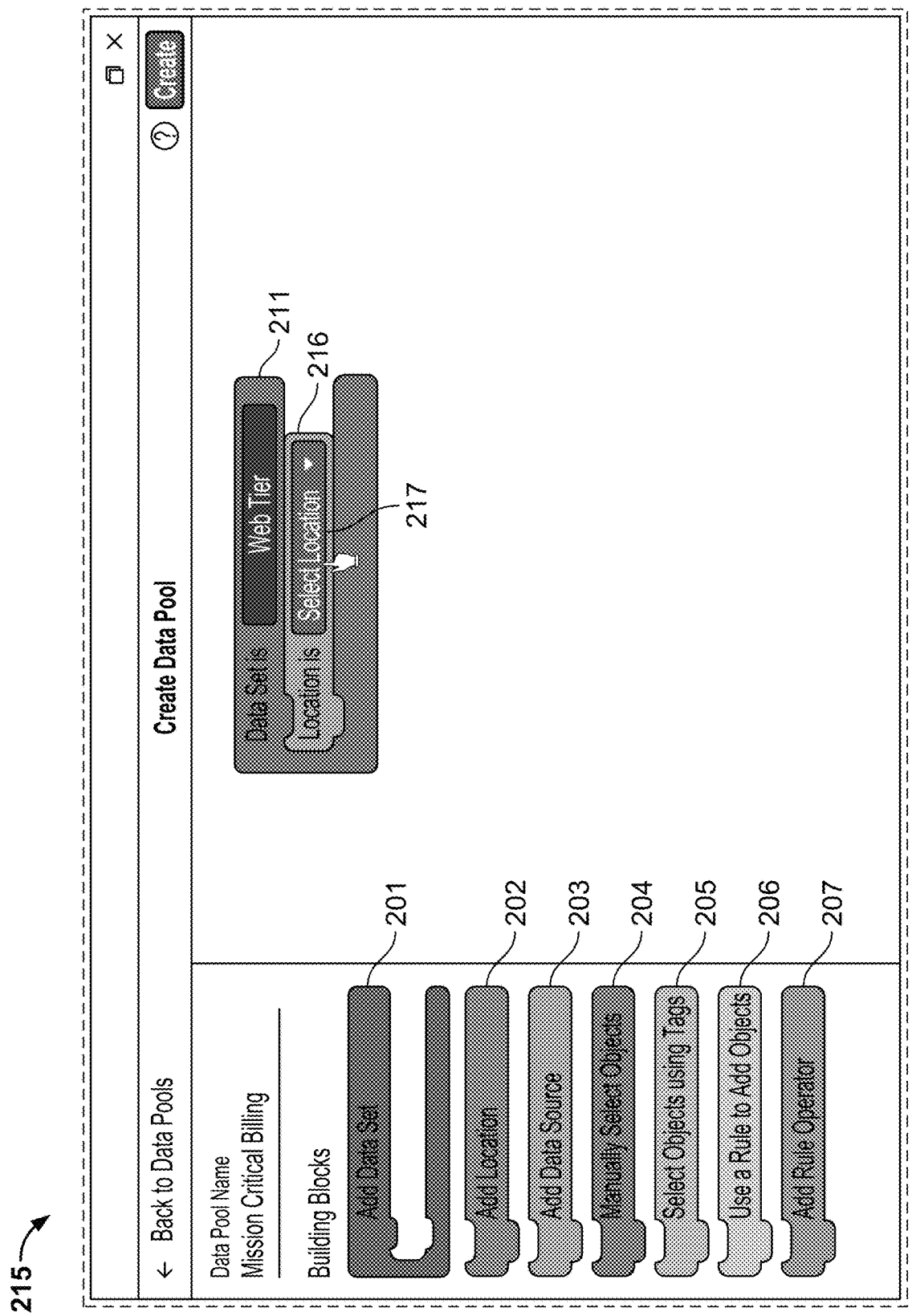

FIG. 2C illustrates an example of a graphical user interface in accordance with some embodiments. In the example shown, graphical user interface 215 has received an instantiation of graphical user interface item 216. The instantiation of graphical user interface item 216 may occur when a user selects graphical user interface item 202 and performs a "drag and drop" operation with respect to graphical user interface 215. Graphical user interface item 216 includes a drop down menu 217 that enables a user to select a location associated with the data set.

Figure 2D:
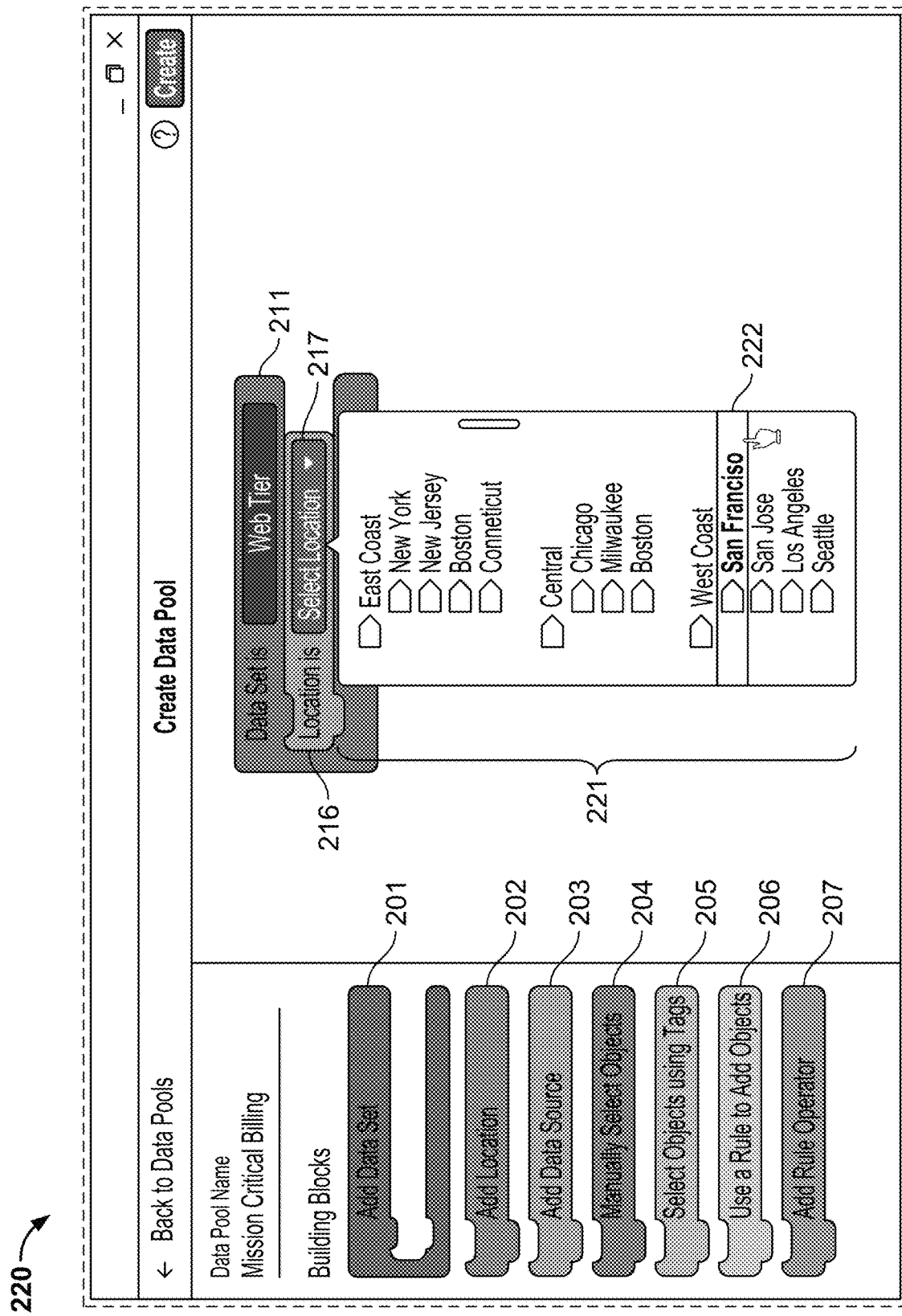

FIG. 2D illustrates an example of a graphical user interface in accordance with some embodiments. In the example shown, graphical user interface 220 has received a selection of drop down menu 217. In response to the selection, drop down menu 217 is expanded to include one or more locations 221. The one or more locations included in the drop down menu may correspond to the regions and/or locations of datacenters associated with an entity. In the example shown, the entity is associated with a first region "East Coast," a second region "Central," and a third region "West Coast."

The first region "East Cost" is associated with a first datacenter located in New York, a second datacenter located in New Jersey, a third datacenter located in Boston, and a fourth datacenter located in Connecticut. The second region "Central" is associated with a first datacenter located in Chicago, a second datacenter located in Milwaukee, and a third datacenter located in Boston. The third region "West Coast" is associated with a first datacenter located in San Francisco, a second datacenter located in San Jose, a third datacenter located in Los Angeles, and a fourth datacenter located in Seattle. A user may select the location to be one or more of the regions included in the one or more locations 221 and/or one or more specific locations included in the one or more locations 221. In the example shown, graphical user interface 220 has received a selection 222 of "San Francisco." As a result of the selection, the data set is specific to one or more objects associated with the data center located in San Francisco.

Figure 2E:
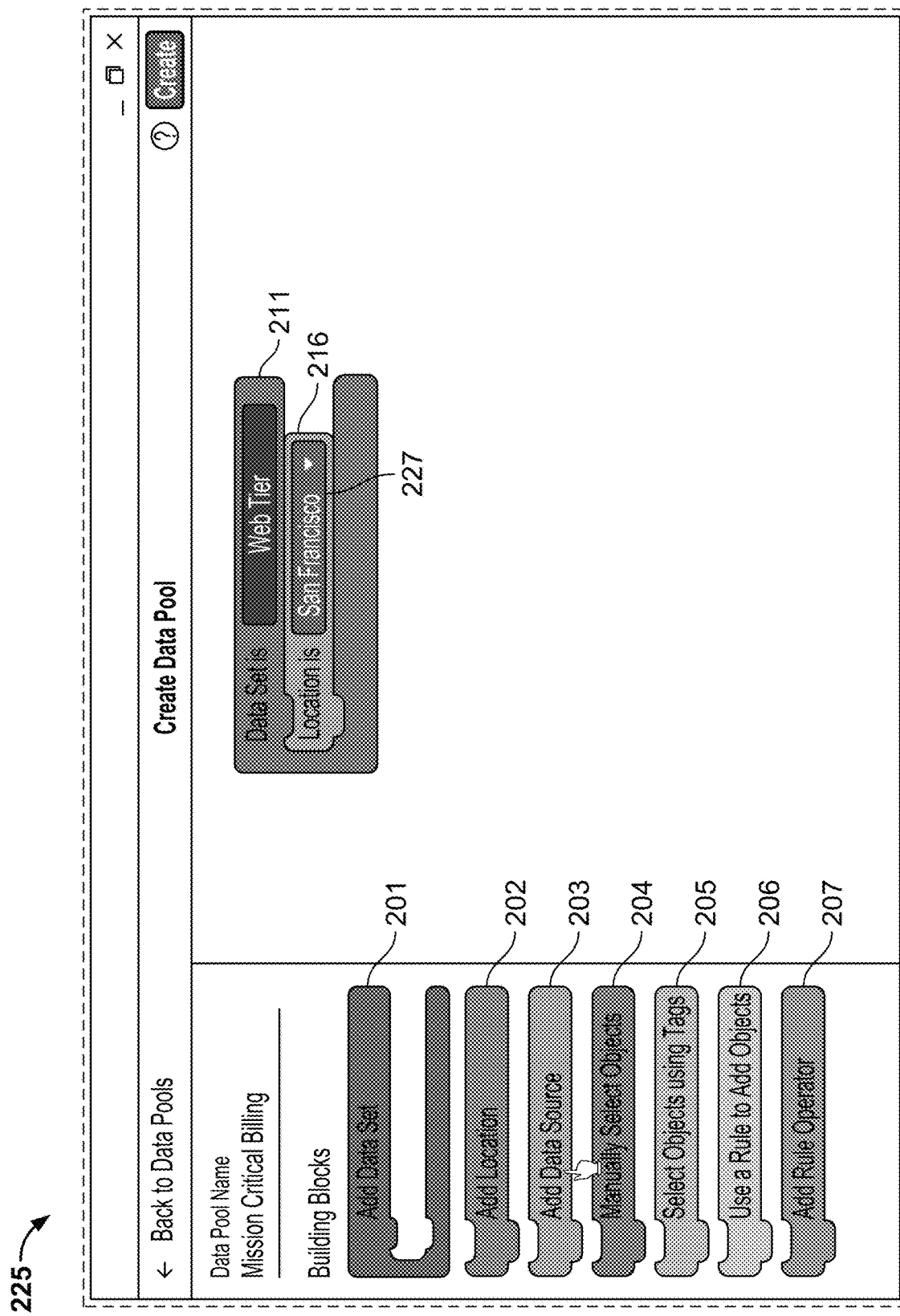

FIG. 2E illustrates an example of a graphical user interface in accordance with some embodiments. In the example shown, graphical user interface 225 is updated to indicate a response to the selection 222 of "San Francisco" shown in FIG. 2D. In response to the selection, drop down menu 217 is modified to a specified location 227 that indicates that San Francisco is the location for the data that is to be included in data set 211.

Figure 2F:
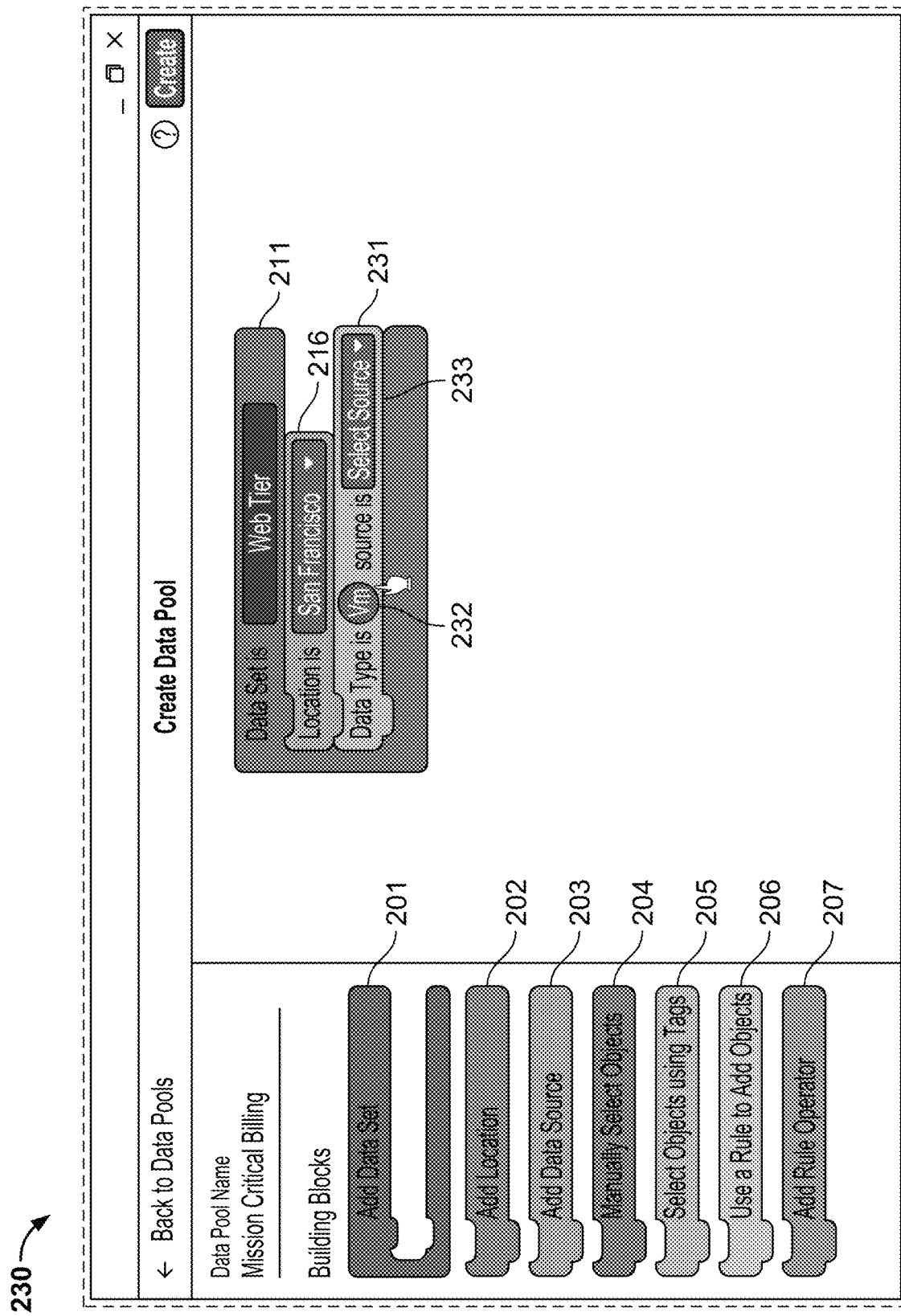

FIG. 2F illustrates an example of a graphical user interface in accordance with some embodiments. In the example shown, graphical user interface 230 has received an instantiation of graphical user interface item 231. The instantiation of graphical user interface item 231 may occur when a user selects graphical user interface item 203 and performs a "drag and drop" operation with respect to graphical user interface 230. Graphical user interface item 231 may have a data type field 232 and a drop down menu 233 to specify a source for a value associated with data type field 232. In the example shown, the value for data type field 232 is "VM." In some embodiments, the data type may be a physical server, a remote adapter, a storage array, a storage volume, a virtual machine, etc. The value for data type field 232 may be modified. Graphical user interface item 231 includes a drop down menu 233 that enables a user to select a source associated with the data type.

Figure 2G:
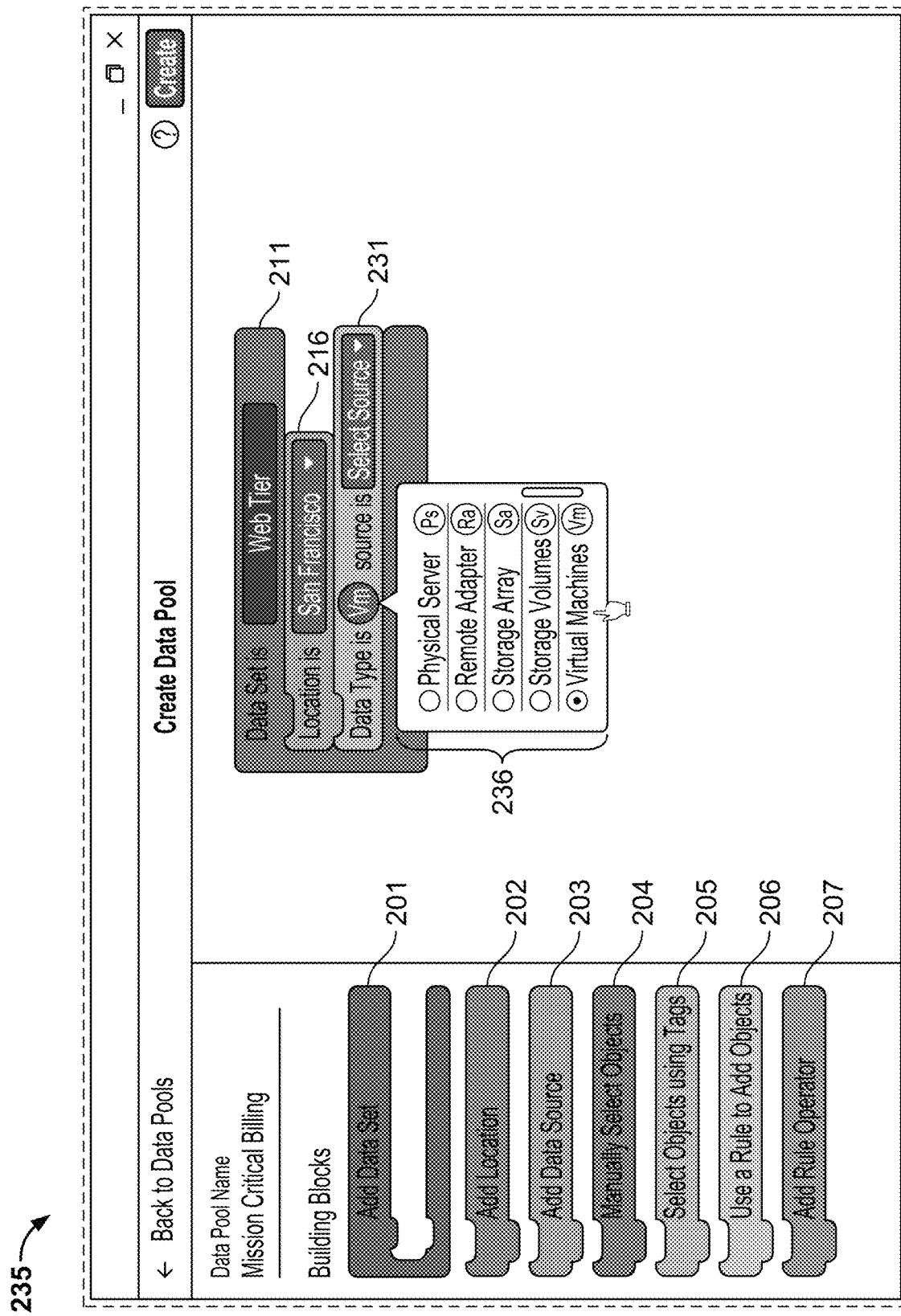

FIG. 2G illustrates an example of a graphical user interface in accordance with some embodiments. In the example shown, graphical user interface 235 has received a selection of data type field 232. In response to the selection, data type field 232 is expanded to include one or more data types 236. In the example shown, the data types include a physical server, a remote adapter, a storage array, storage volumes, and virtual machines.

Figure 2H:
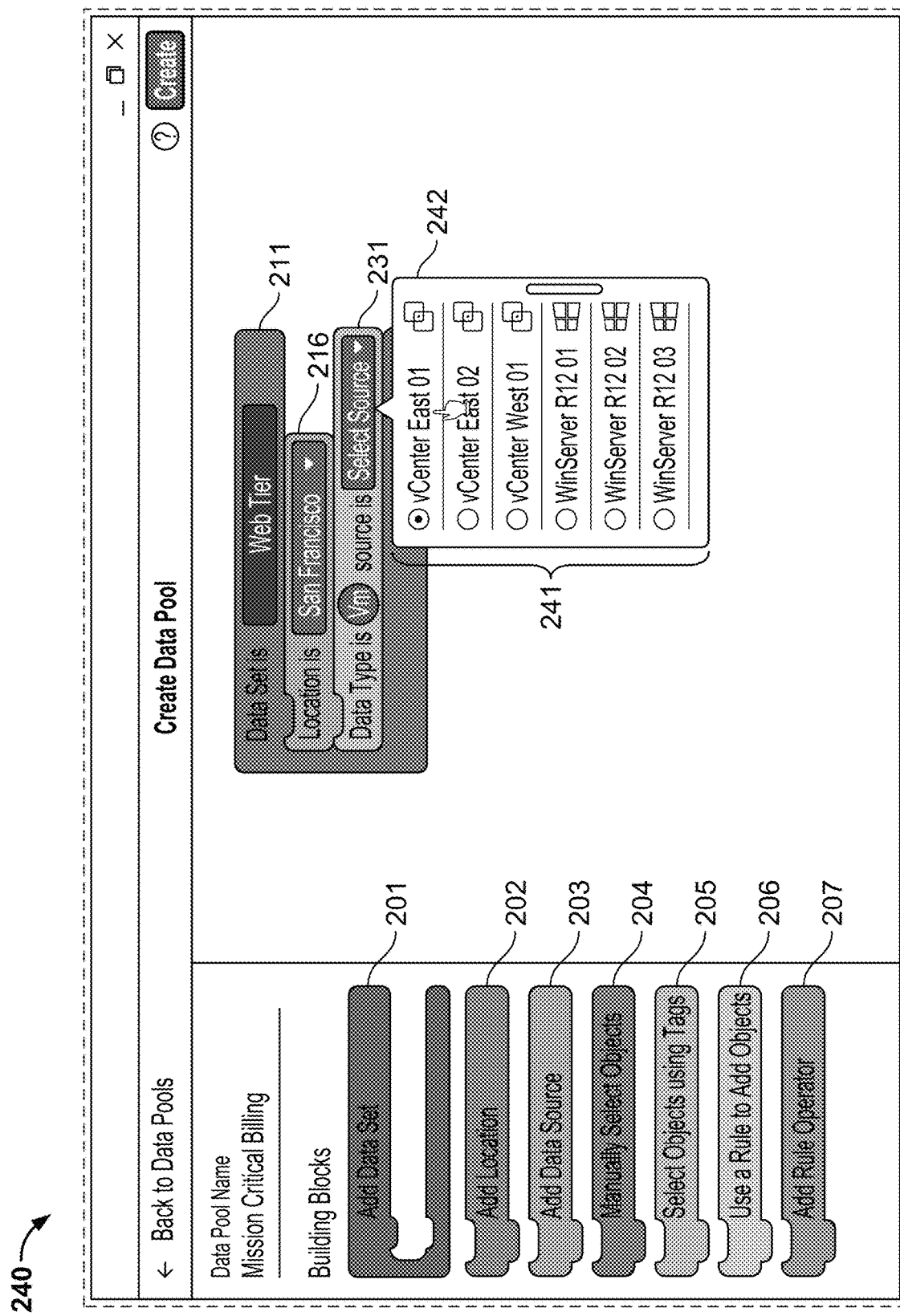

FIG. 2H illustrates an example of a graphical user interface in accordance with some embodiments. In the example shown, graphical user interface 240 has received a selection of drop down menu 233. In response to the selection, drop down menu 233 is expanded to include one or more data sources 241. In the example shown, the one or more data sources include "vCenter East 01," "vCenter East 02," "vCenter West 01," "WinServer R12 01," "WinServer R12 02," and "WinServer R12 03." Graphical user interface 240 has received a selection 242 of "vCenter East 01."

Figure 2I:
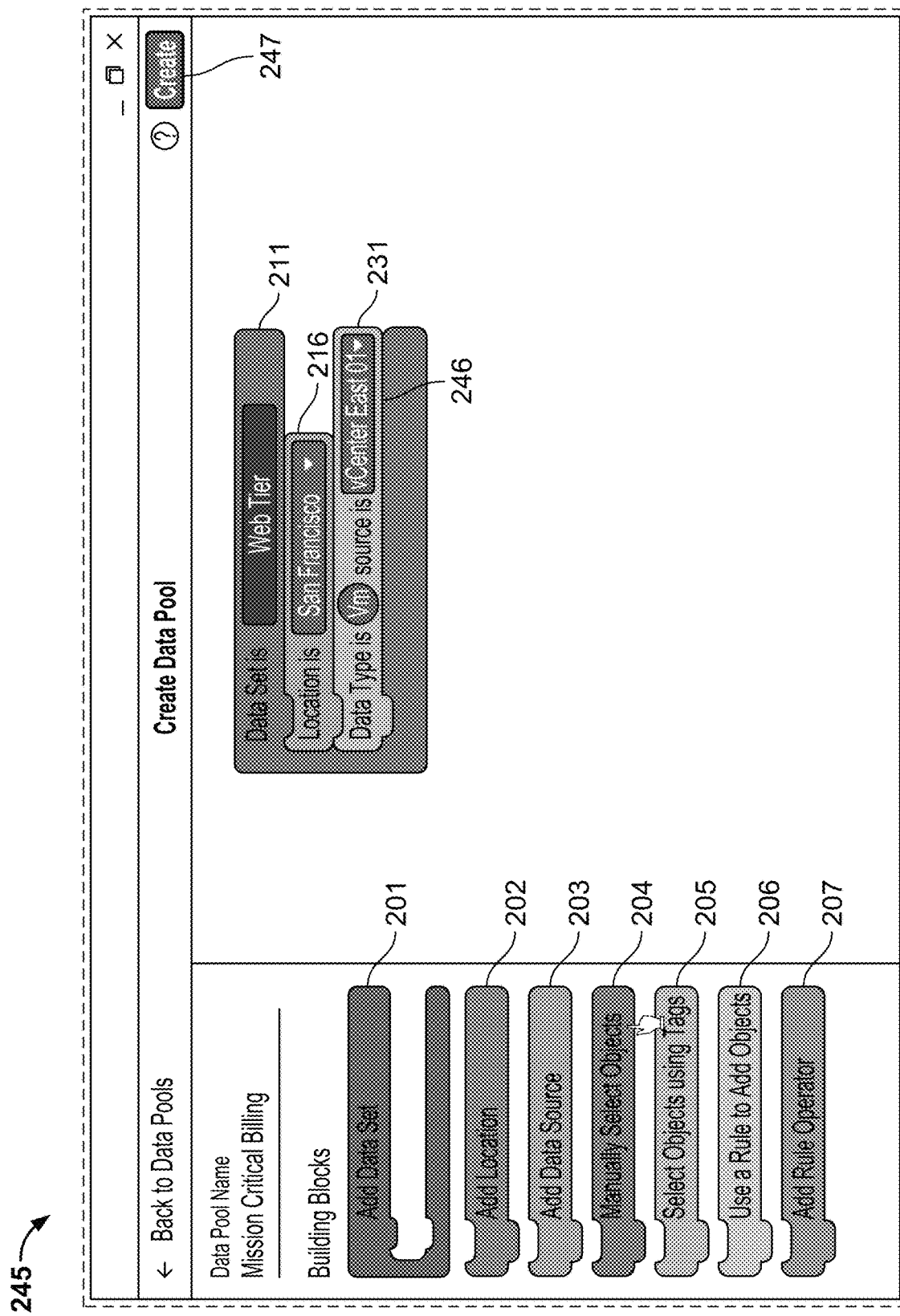

FIG. 2I illustrates an example of a graphical user interface in accordance with some embodiments. In the example shown, graphical user interface 245 is updated to indicate a response to the selection 242 of "vCenter East 01" shown in FIG. 2H. In response to the selection, drop down menu 233 is modified from "select source" to a specified data source 246 that indicates that "vCenter East 01" is the data source for data having a data type of "VM." The data set created in FIGS. 2A-2I, i.e., "Mission Critical Billing," may be saved clicking on the create button 247. The data set may be added to a data pool to achieve an intent-based data management plan.

Figure 3A:
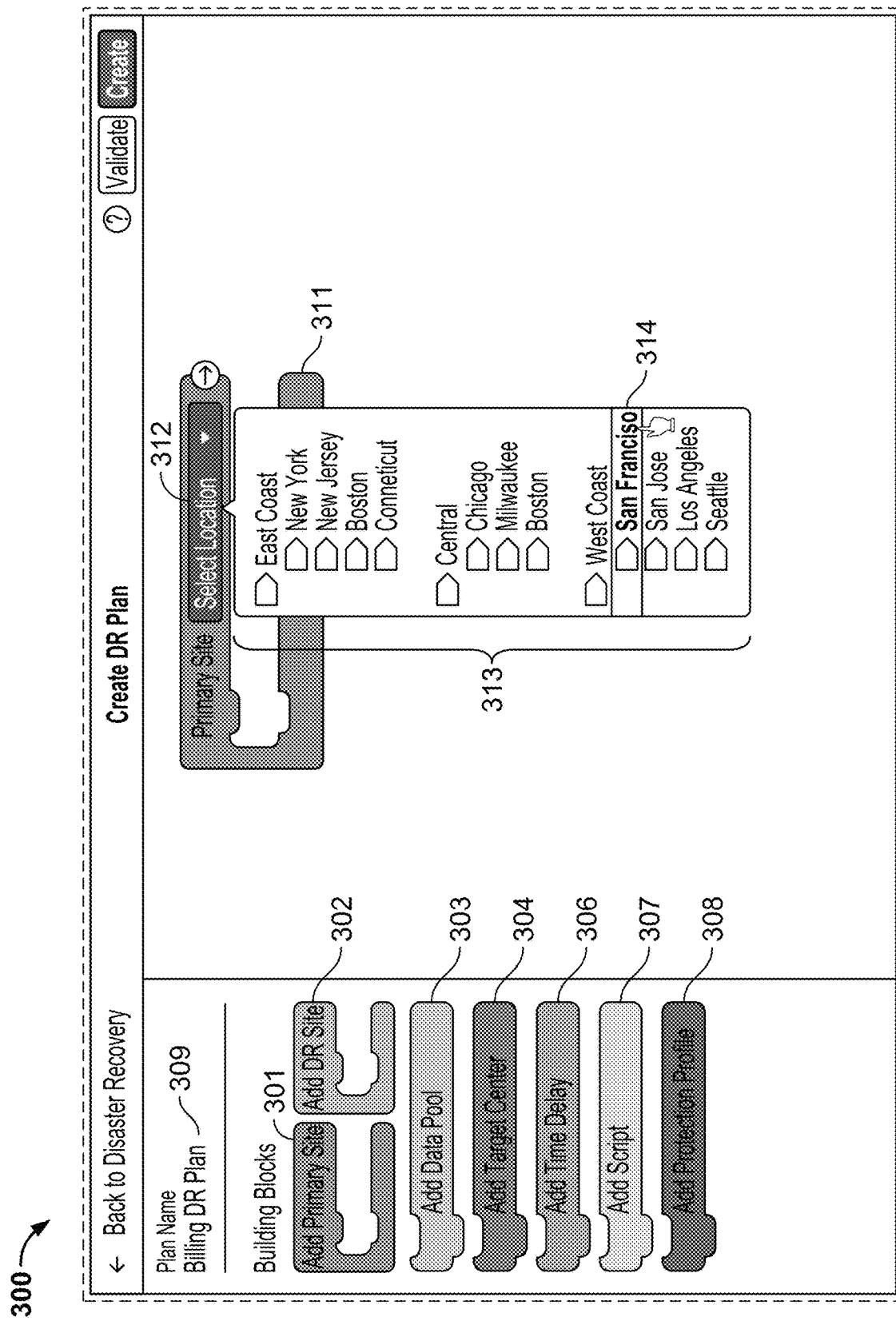
FIGS. 3A-3S illustrate examples of a graphical user interface in accordance with some embodiments.
Figure 3B:
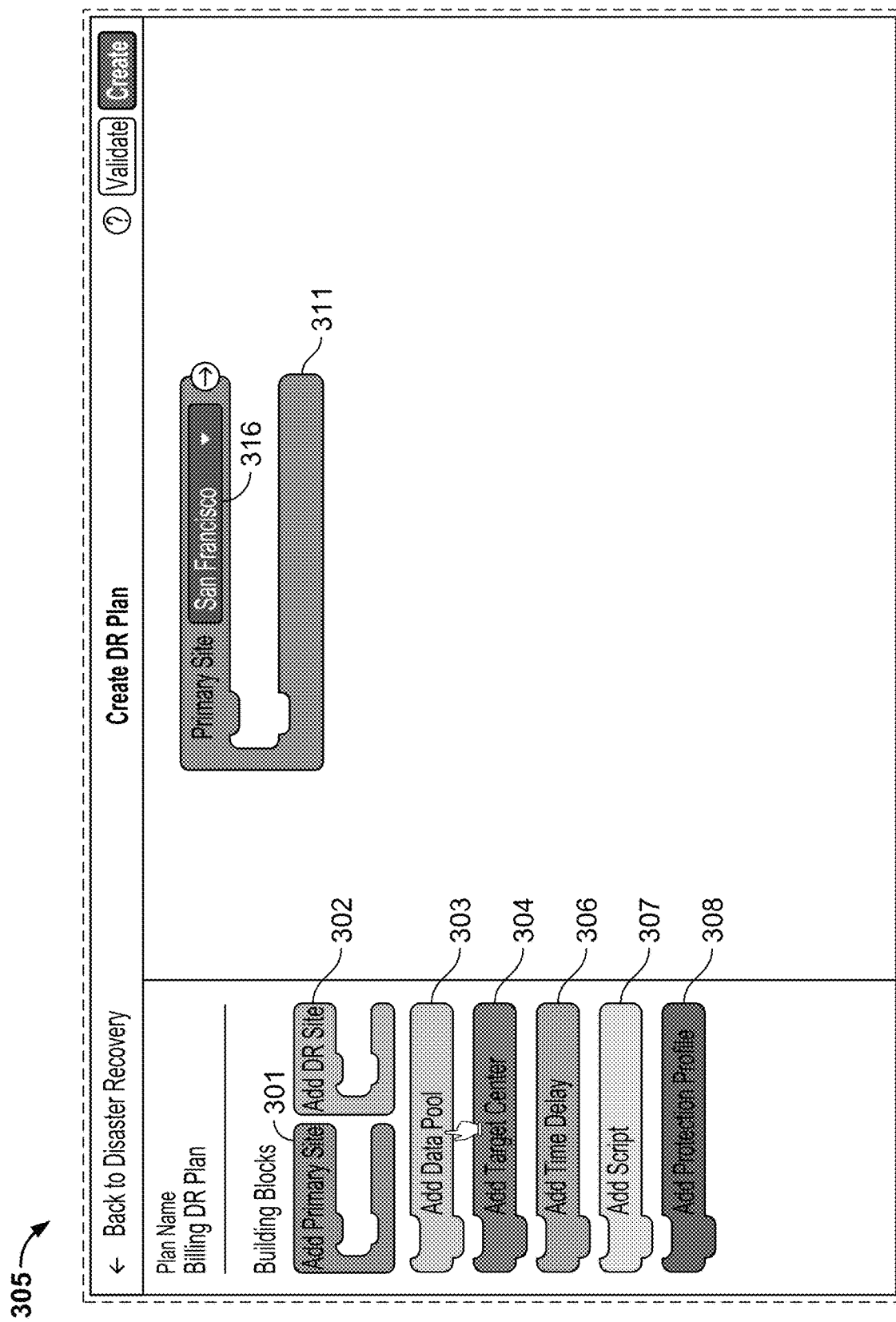
Figure 3C:
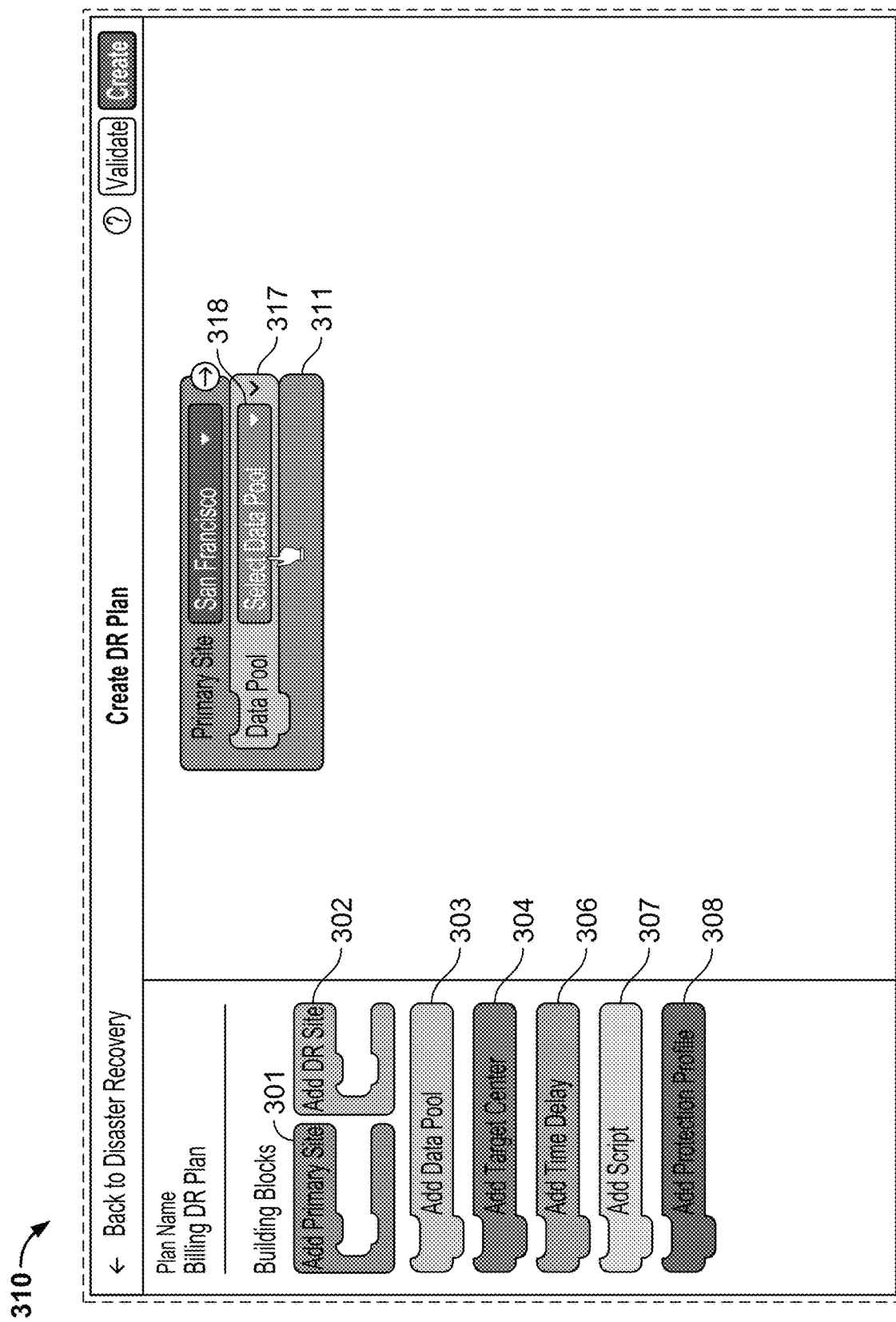
Figure 3D:
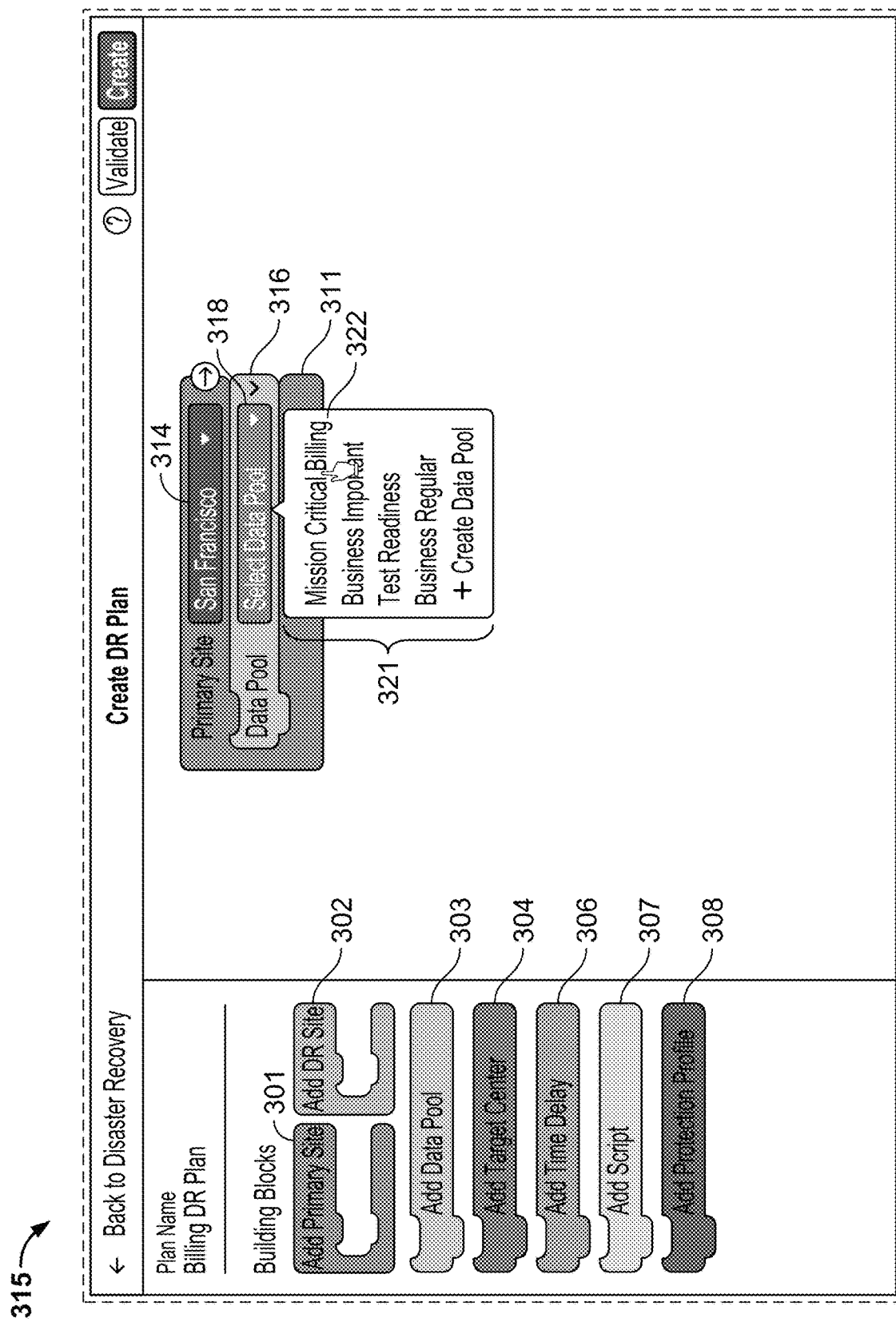
Figure 3E:
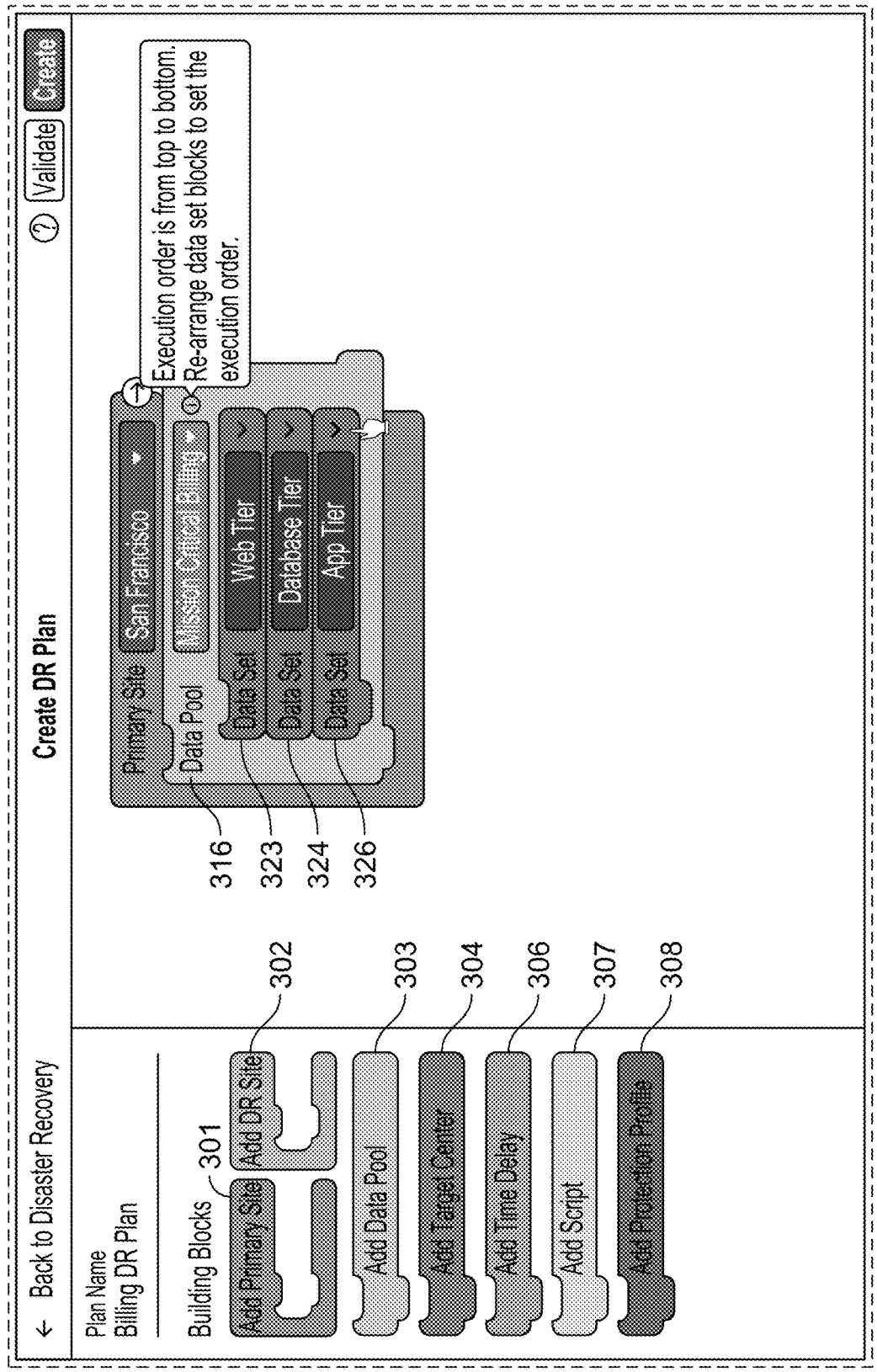
Figure 3F:
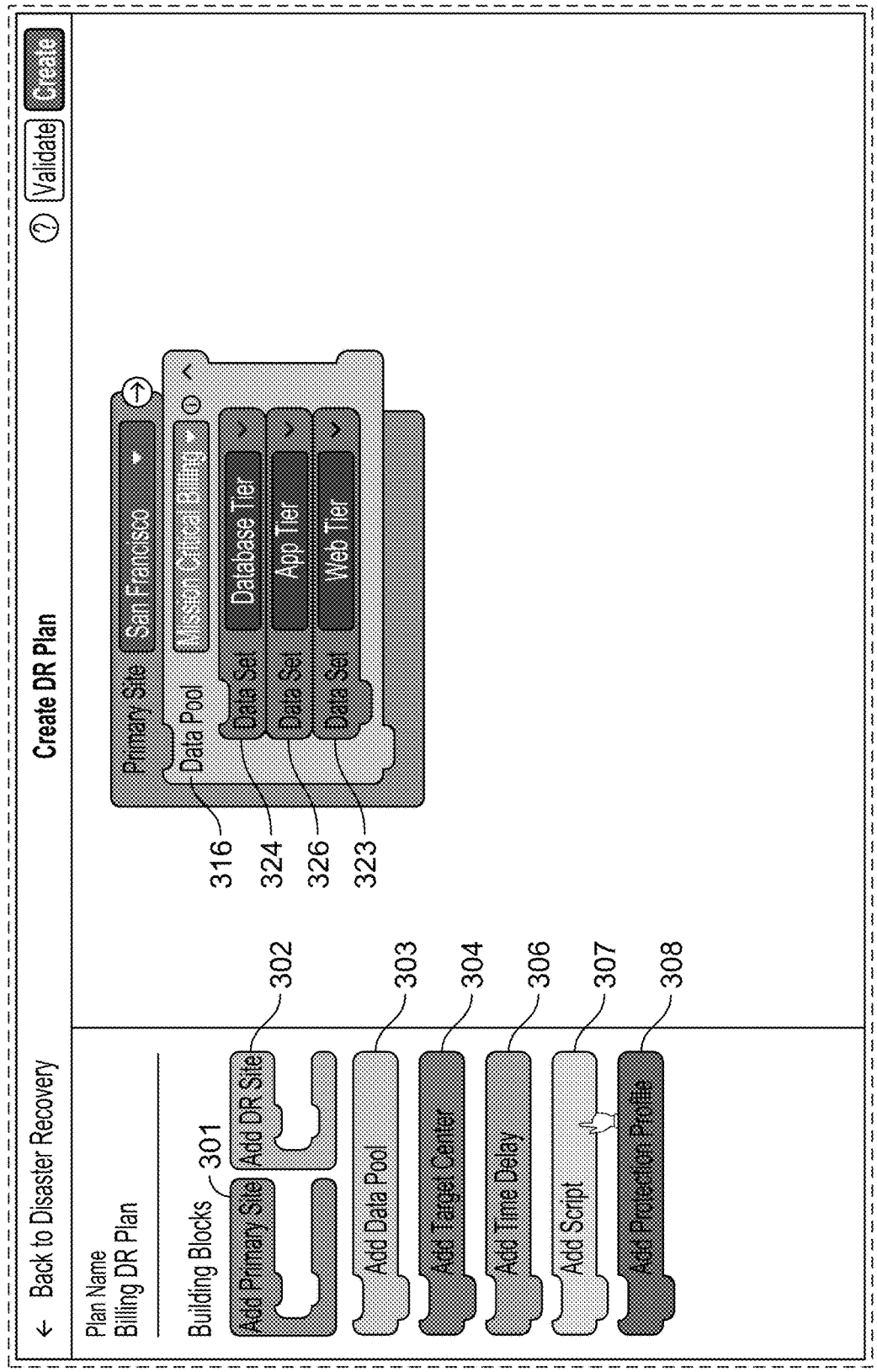
Figure 3G:
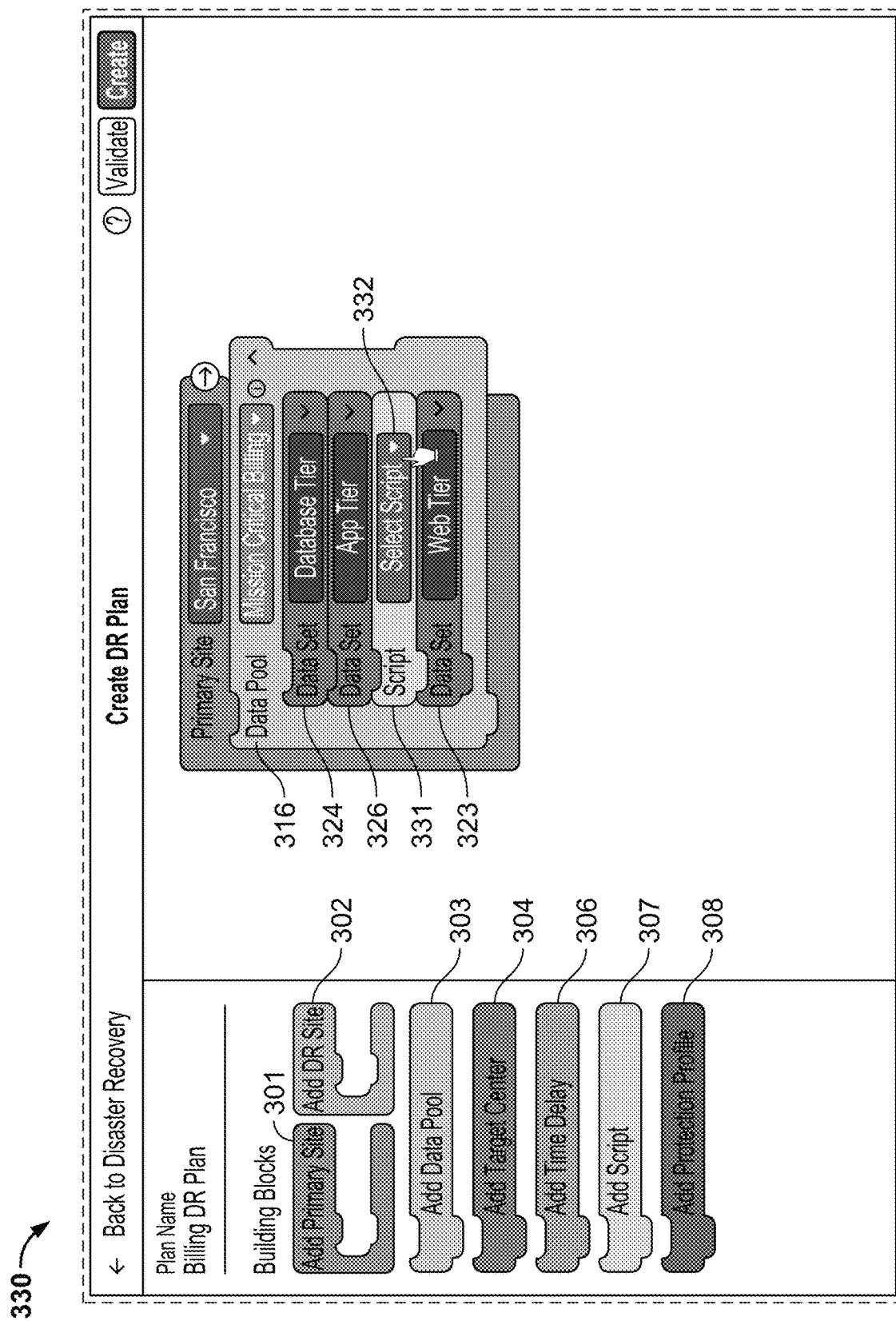
Figure 3H:
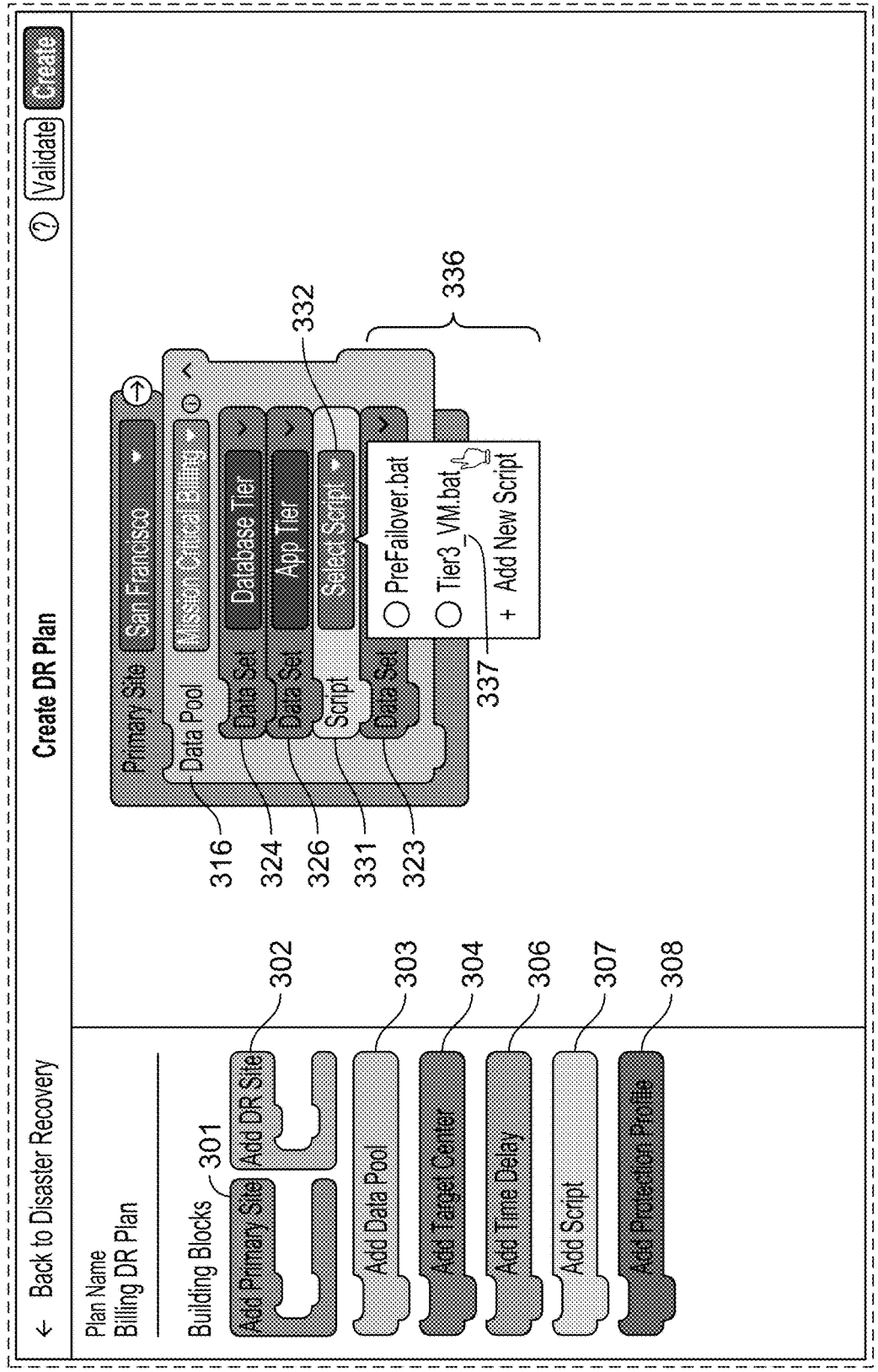
Figure 3I:
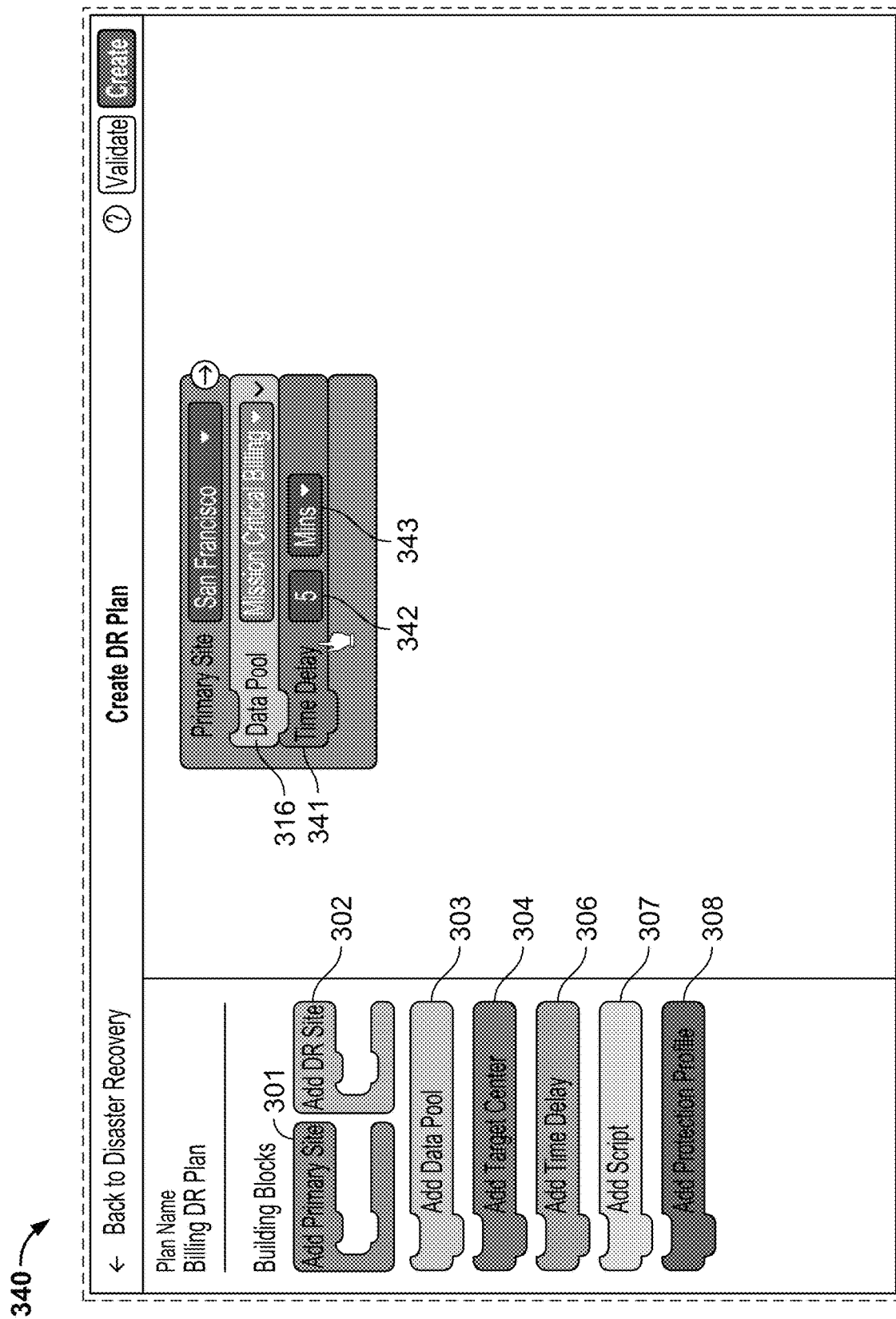
Figure 3J:
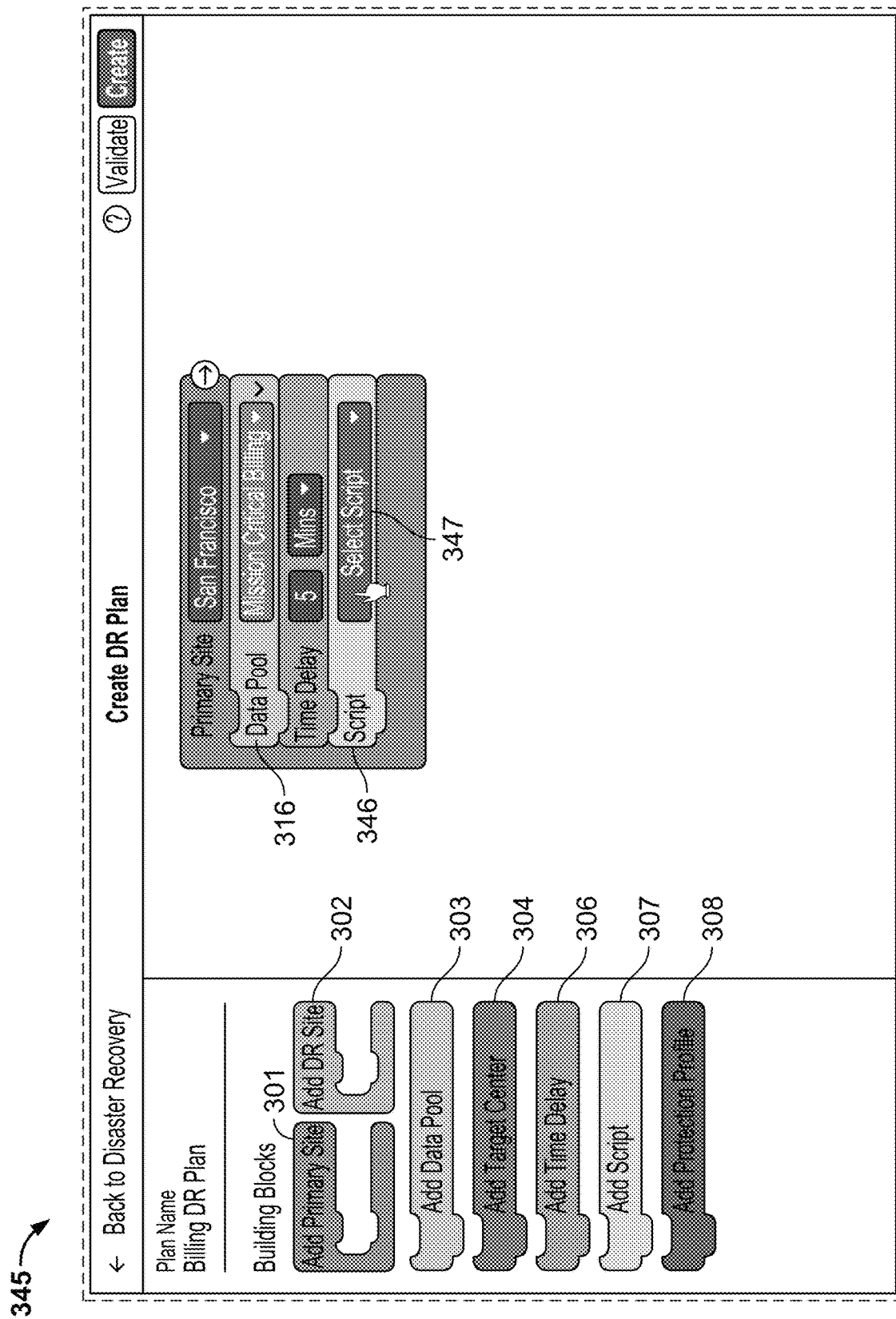
Figure 3K:
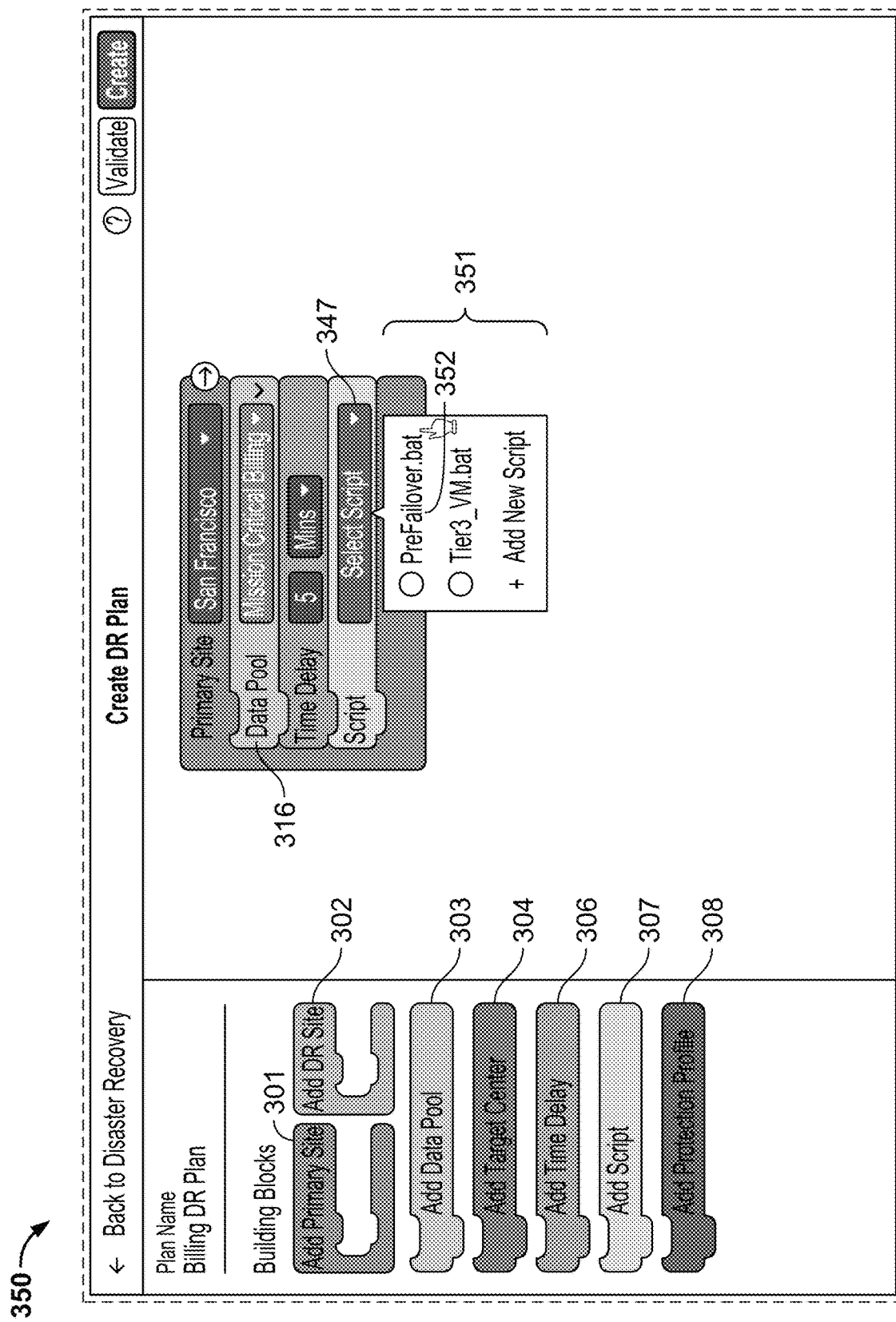
Figure 3L:
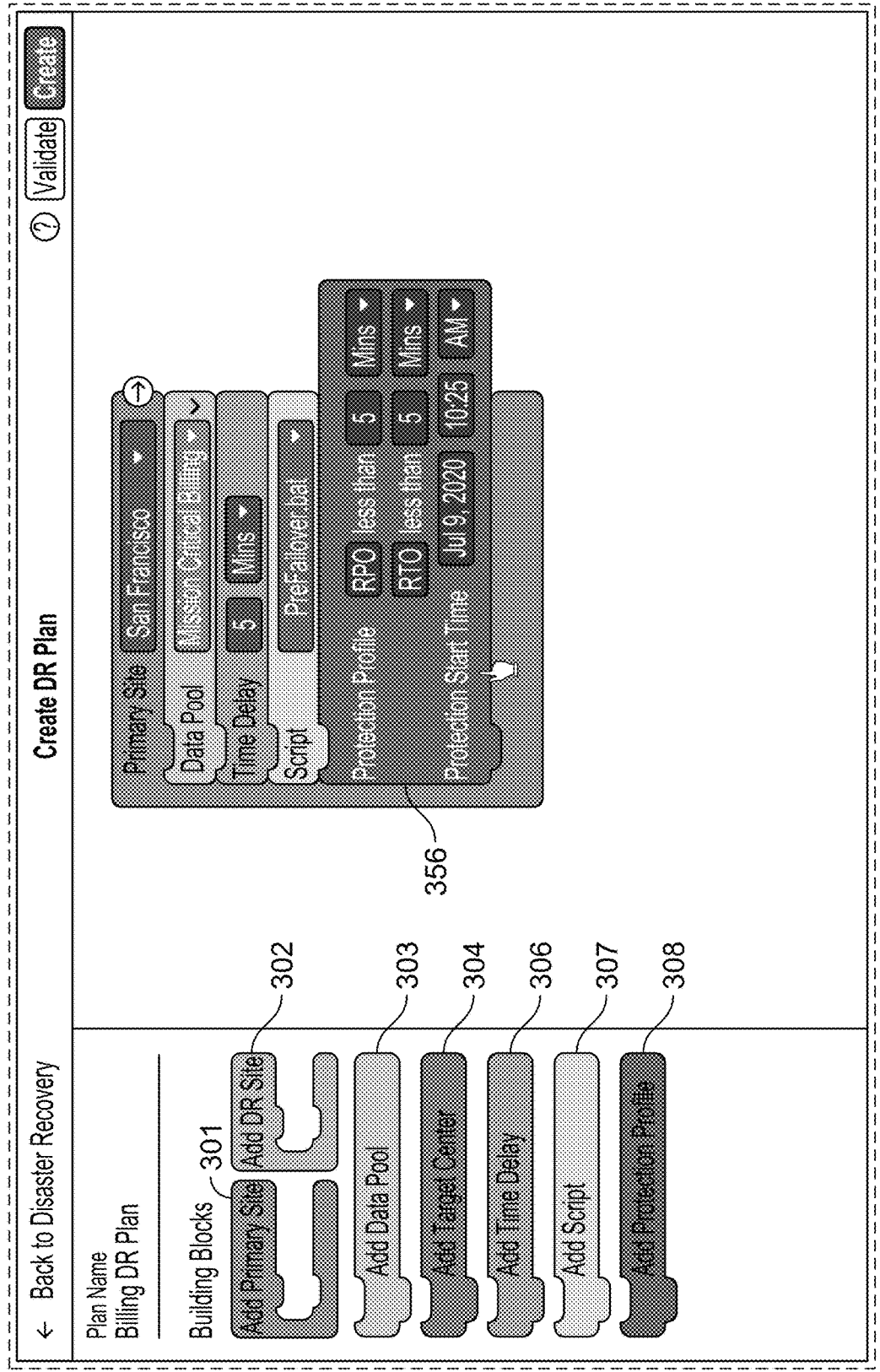
Figure 3M:
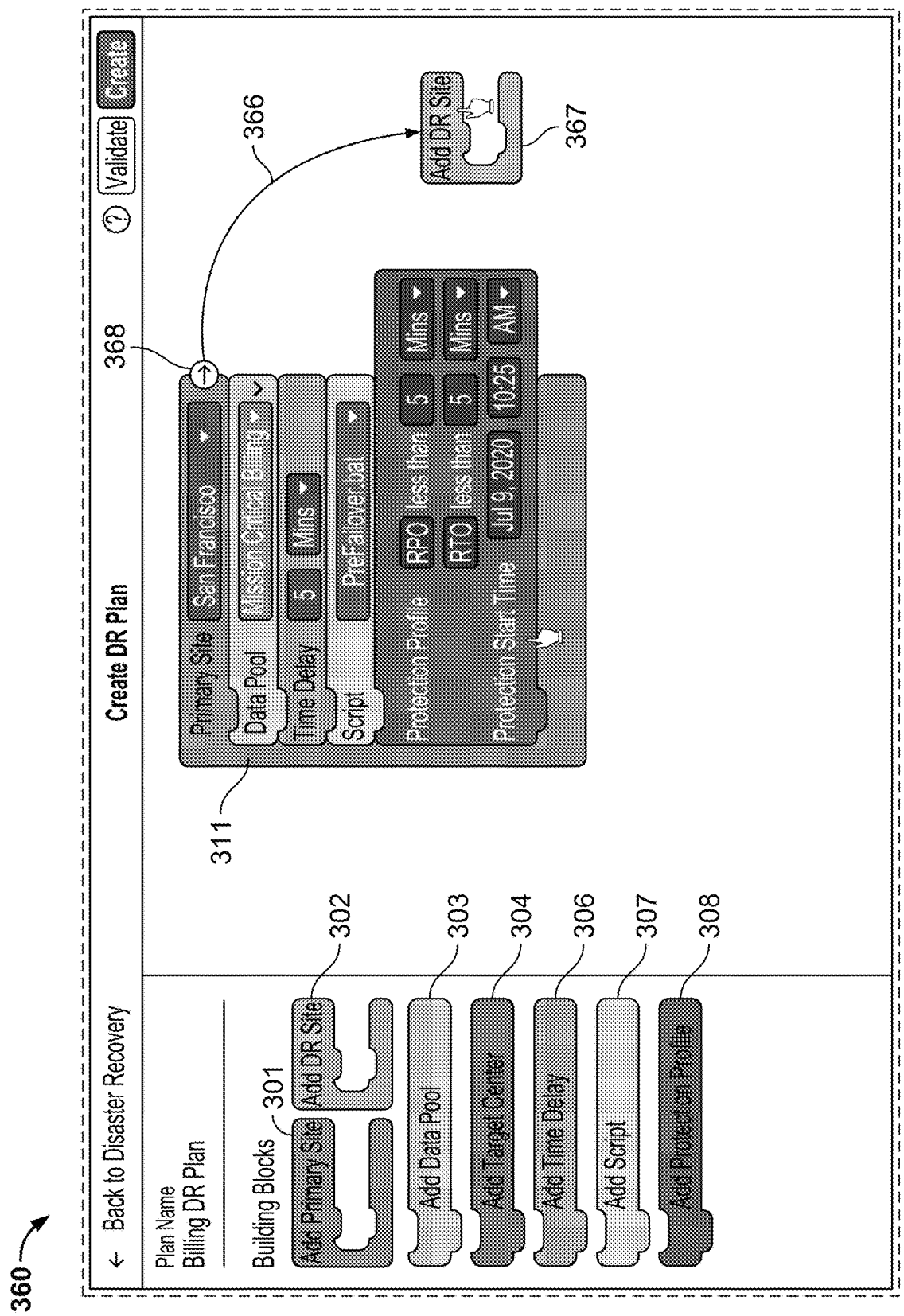
Figure 3N:
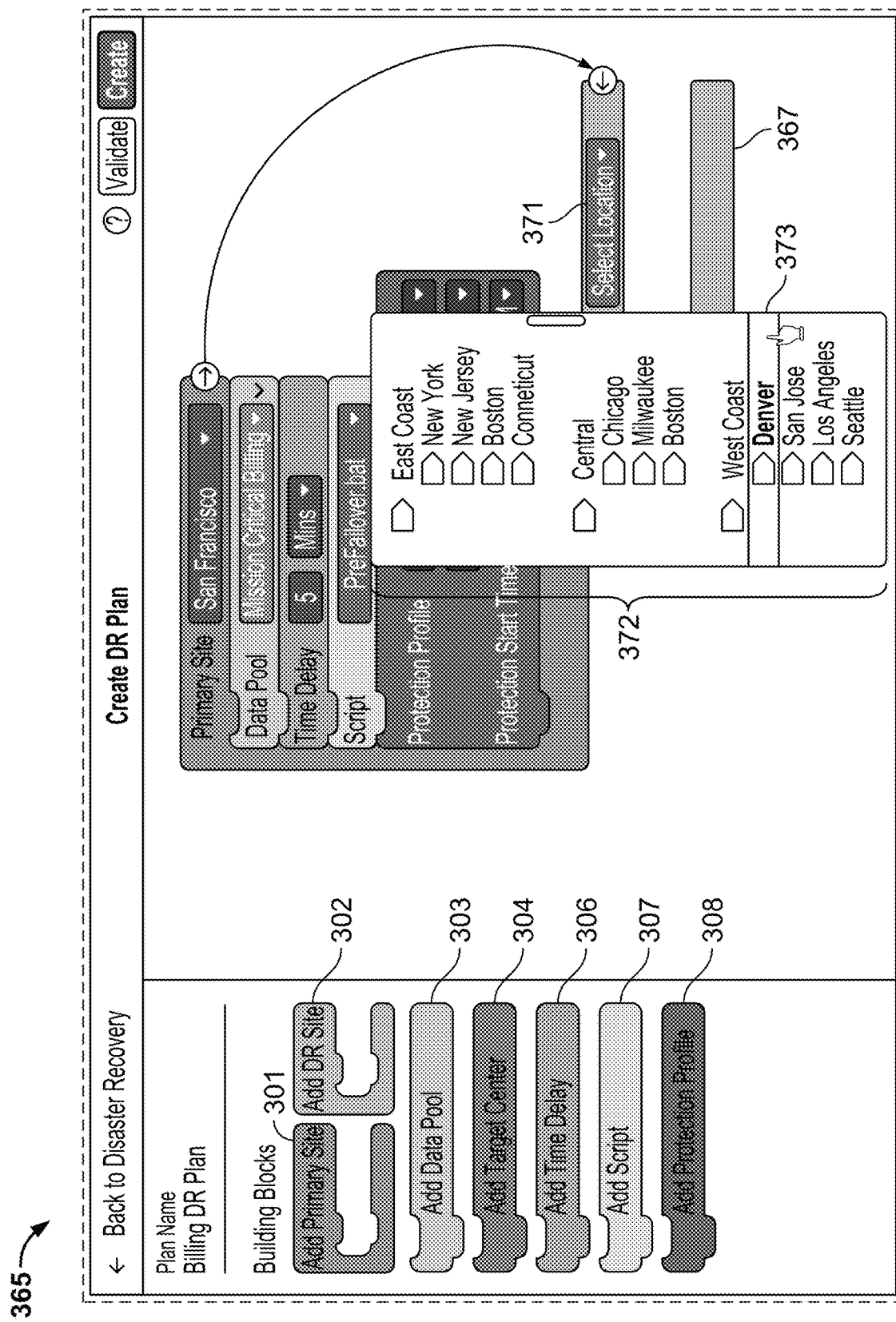
Figure 3O:
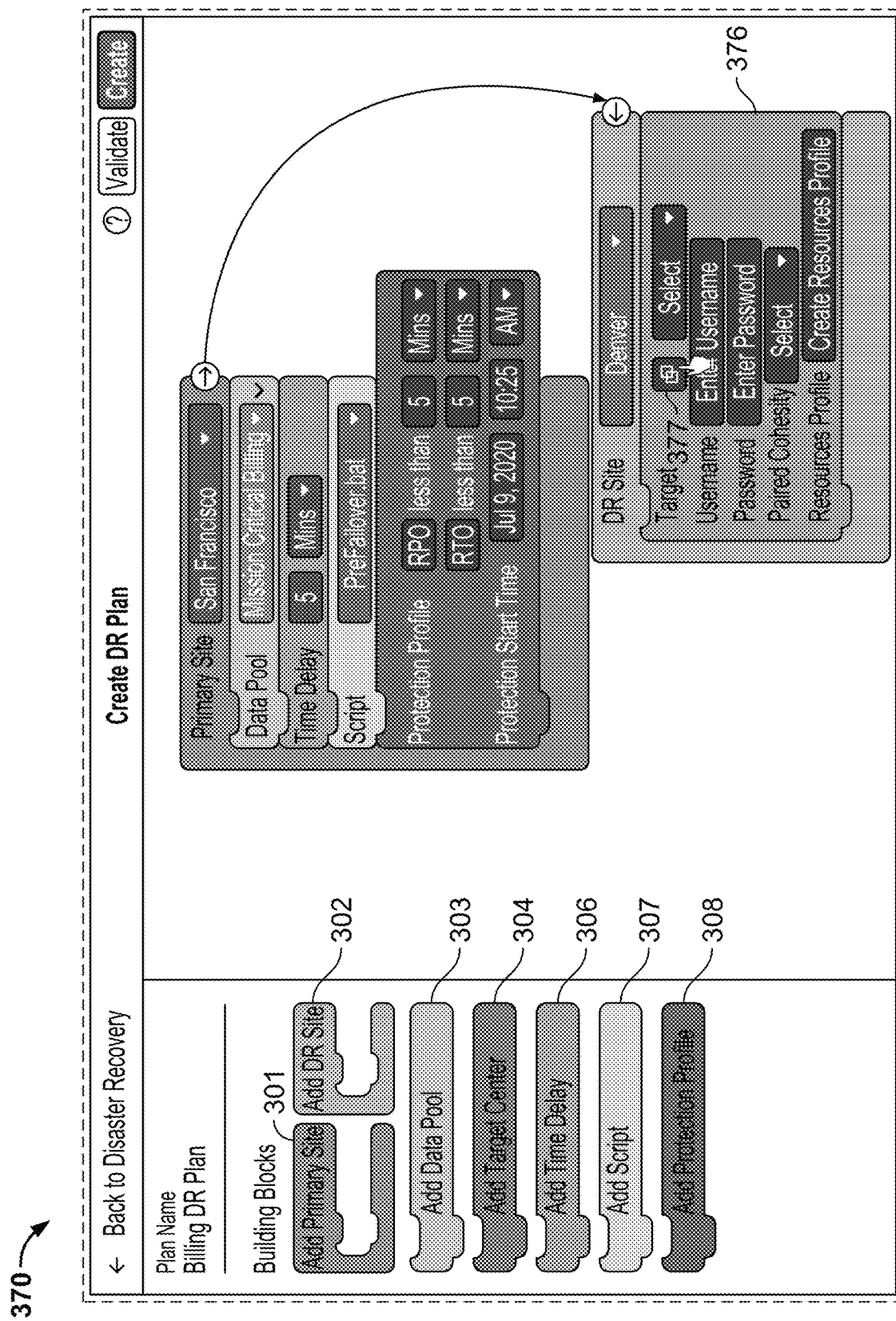
Figure 3P:
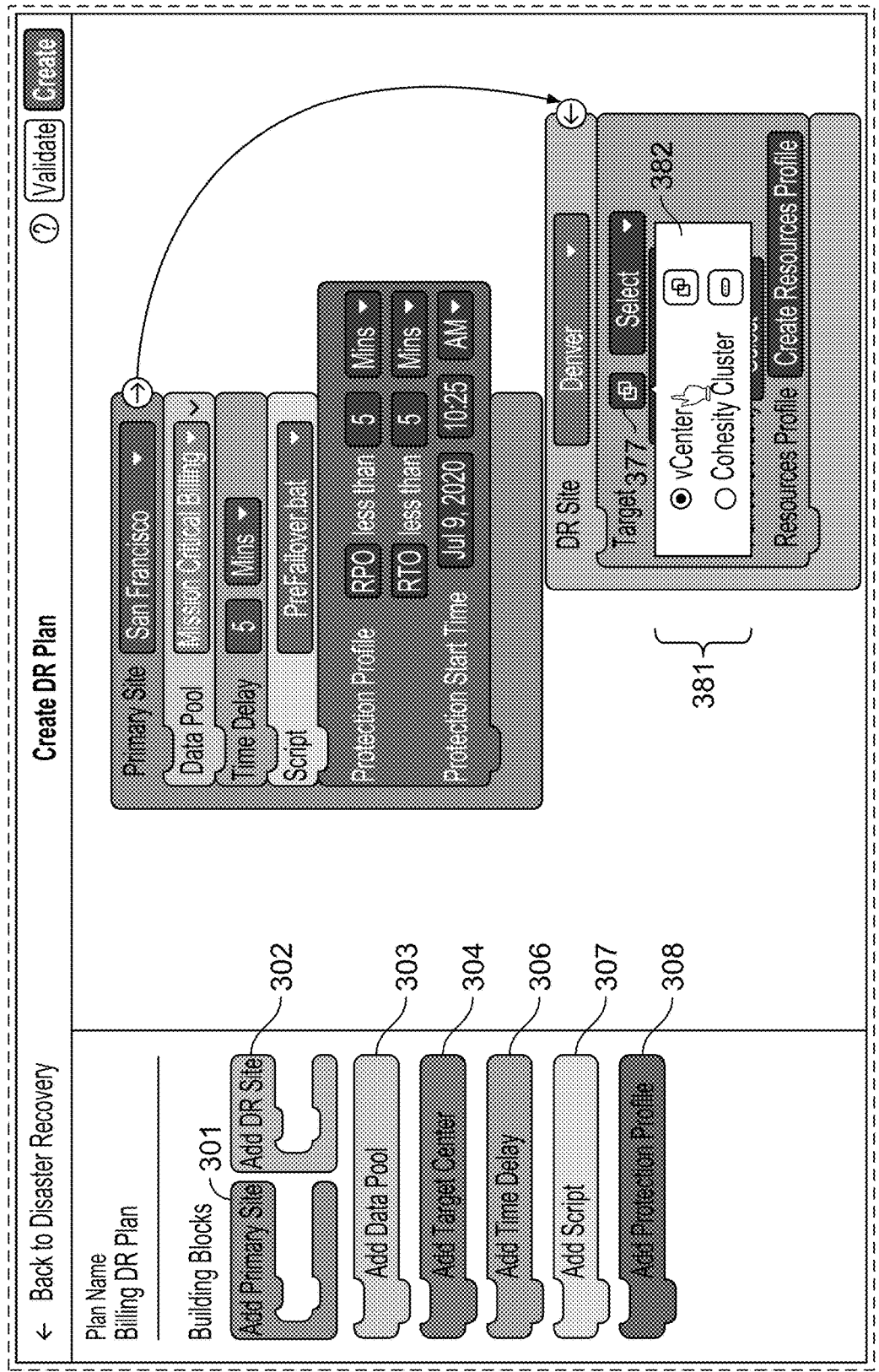
Figure 3Q:
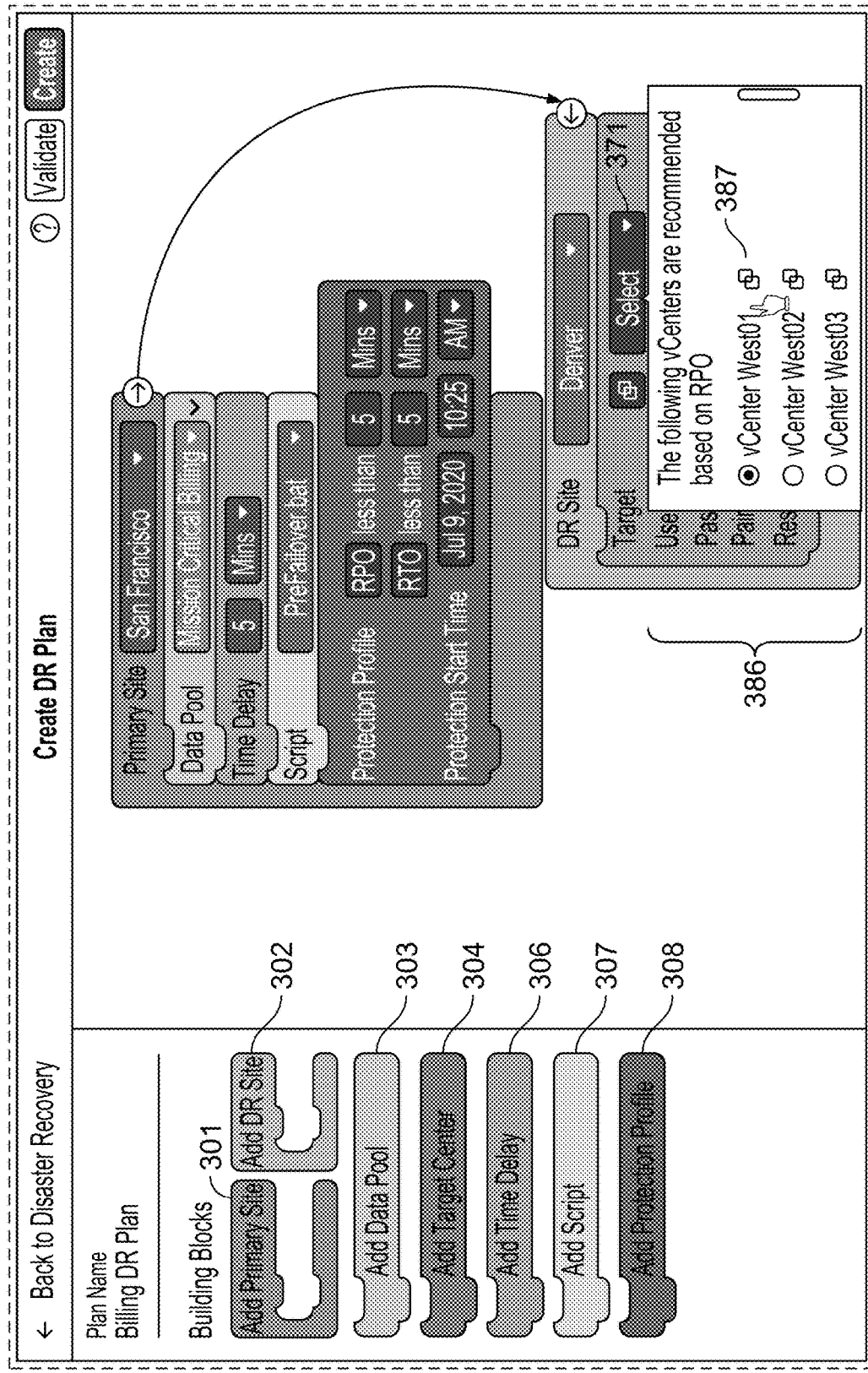
Figure 3R:
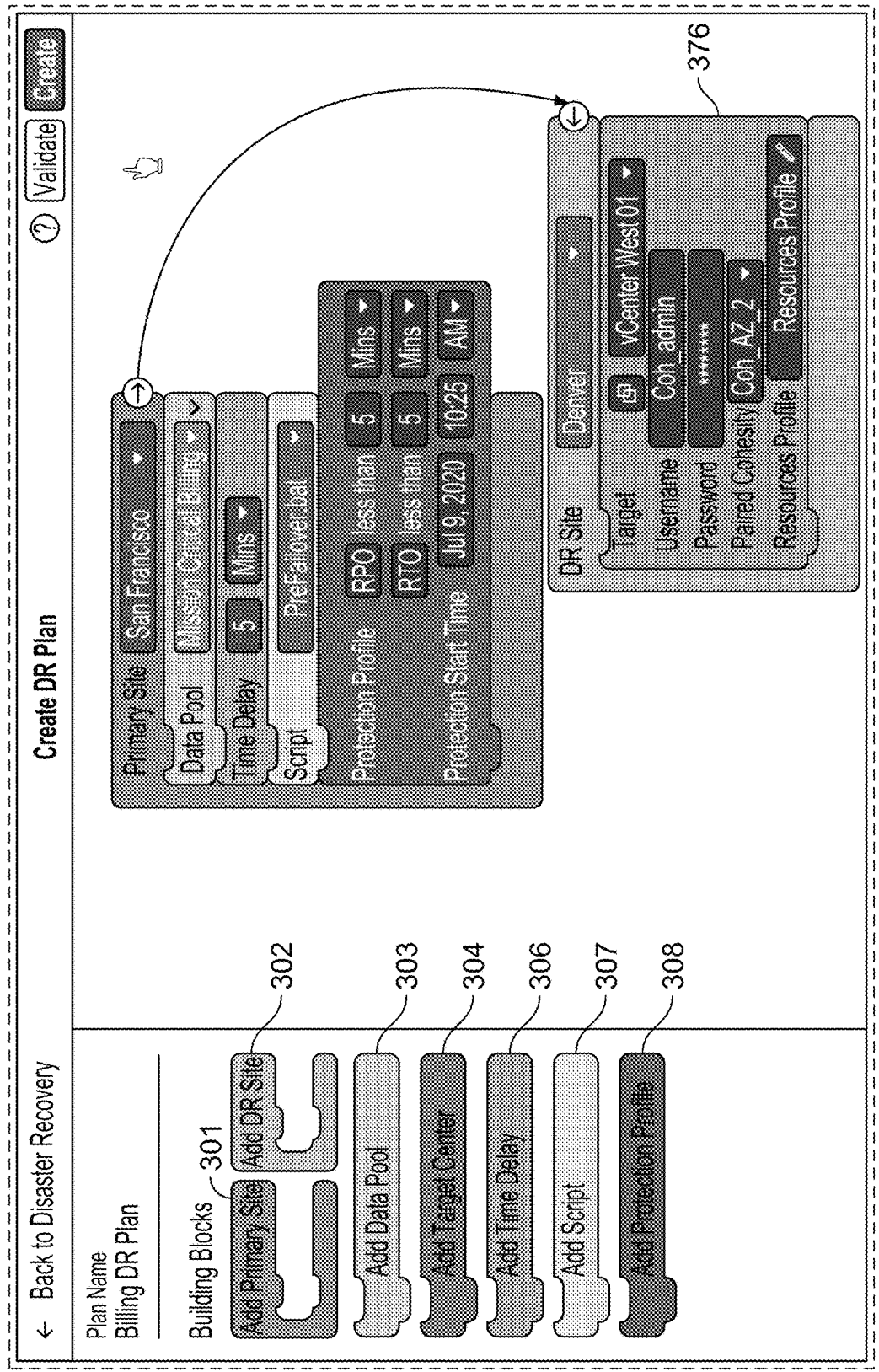
Figure 3S:
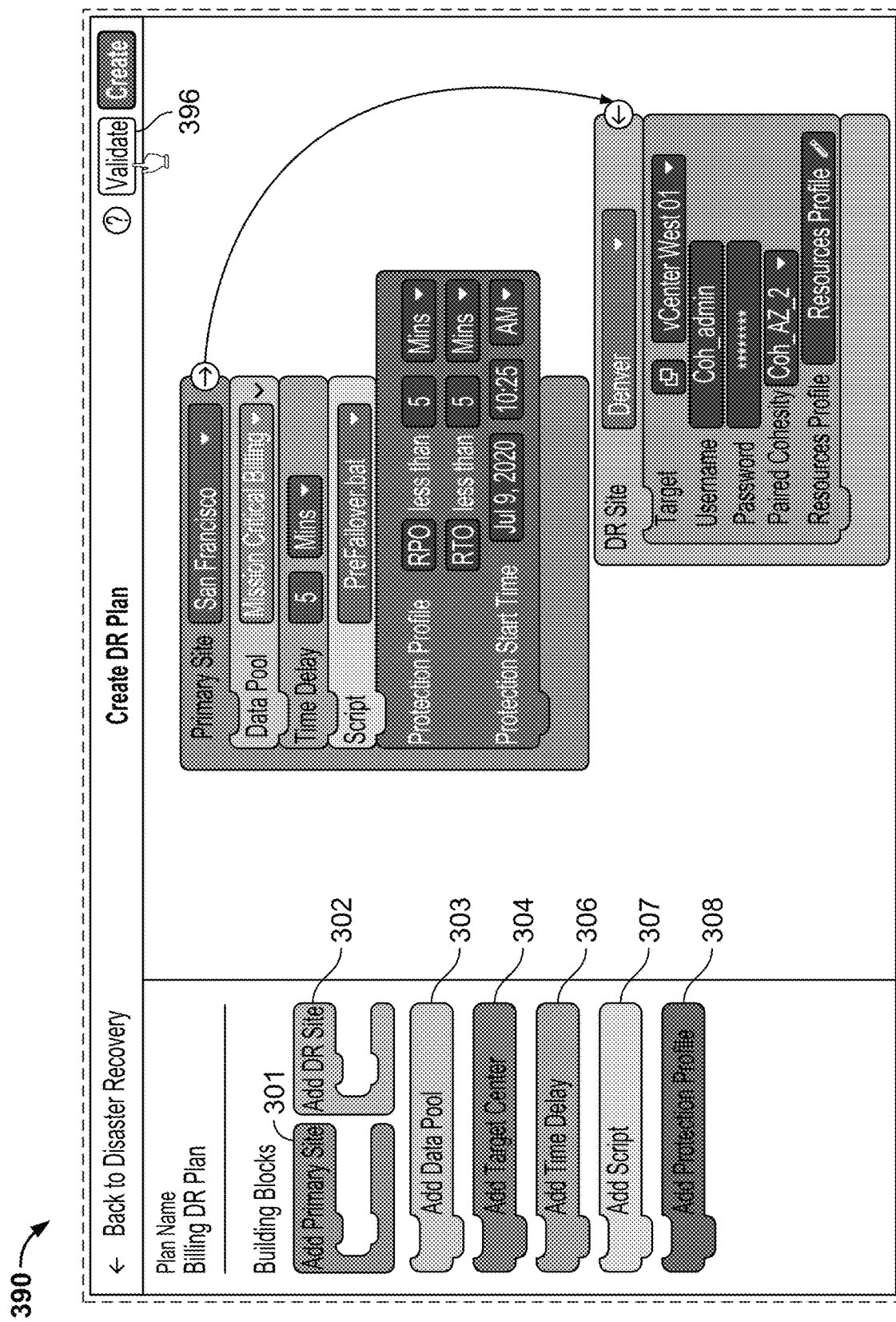

FIGS. 3A-3S illustrate an example of using a graphical user interface to specify a data management service, such as disaster recovery, in accordance with some embodiments. The graphical user interface illustrated in FIGS. 3A-3S may be used to specify other data management services, such as a backup, migration, replication, restoration, security, file tiering, etc.

FIG. 3A illustrates an example of a graphical user interface in accordance with some embodiments. In the example shown, graphical user interface 300 includes a plurality of building blocks. The plurality of building blocks may be used to specify a data management service. In the example shown, the plurality of building blocks is being used to specify a disaster recovery plan.

The plurality of building blocks includes graphical user interface item 301 that enables a user to specify a primary site associated with a data management service, graphical user interface item 302 that enables a user to specify a disaster recovery site associated with the data management service, graphical user interface item 303 that enables a user to specify a data pool associated with the data management service, graphical user interface item 304 that enables a user to specify a target center associated with the data management service, graphical user interface item 306 that enables a user to specify a time delay associated with the data management service, graphical user interface item 307 that enables a user to specify a script associated with the data management service, and graphical user interface item 308 that enables a user to specify a protection profile associated with the data management service. Each of the graphical user interface items 301-307 may be referred to as a "data pool component."

In the example shown, graphical user interface 300 has received an input 309 that indicates the name of the disaster recovery plan is "Billing DR Plan." Graphical user interface 300 has received an instantiation of graphical user interface item 311. The instantiation of graphical user interface item 311 may occur when a user selects graphical user interface item 301 and performs a "drag and drop" operation with respect to graphical user interface 300.

Graphical user interface item 311 includes a drop down menu 312 that enables a user to select a location associated with the data set. In the example shown, graphical user interface 300 has received a selection of drop down menu 312. In response to the selection, drop down menu 312 is expanded to include one or more locations 313. The one or more locations 313 included in drop down menu 312 may correspond to the regions and/or locations of datacenters associated with an entity. In the example shown, the entity is associated with a first region "East Coast," a second region "Central," and a third region "West Coast."

The first region "East Cost" is associated with a first datacenter located in New York, a second datacenter located in New Jersey, a third datacenter located in Boston, and a fourth datacenter located in Connecticut. The second region "Central" is associated with a first datacenter located in Chicago, a second datacenter located in Milwaukee, and a third datacenter located in Boston. The third region "West Coast" is associated with a first datacenter located in San Francisco, a second datacenter located in San Jose, a third datacenter located in Los Angeles, and a fourth datacenter located in Seattle. In the example shown, graphical user interface 300 has received a selection 314 of "San Francisco." This indicates a primary site location for disaster recovery.

FIG. 3B illustrates an example of a graphical user interface in accordance with some embodiments. In the example shown, graphical user interface 305 is updated to indicate a response to the selection 314 of "San Francisco" shown in FIG. 3A. In response to the selection, drop down menu 312 is modified from "select location" to a specified location 316 that indicates that San Francisco is the primary site for the disaster recovery plan.

FIG. 3C illustrates an example of a graphical user interface in accordance with some embodiments. In the example shown, graphical user interface 310 has received an instantiation of graphical user interface item 317. The instantiation of graphical user interface item 317 may occur when a user selects graphical user interface item 303 and performs a "drag and drop" operation with respect to graphical user interface 310. Graphical user interface item 317 includes a drop down menu 318 that enables a user to select a data pool associated with the primary site.

FIG. 3D illustrates an example of a graphical user interface in accordance with some embodiments. In the example shown, graphical user interface 315 has received a selection of drop down menu 318. In response to the selection, drop down menu 318 is expanded to include one or more data pools 321, such as "Mission Critical Billing," (indicated by 322) "Business Important," "Test Readiness," and "Business Regular." The one or more data pools 321 may correspond to the data pools created using graphical user interface 200. For example, the "Mission Critical Billing" data pool includes the data set generated in FIGS. 2A-2I.

In some embodiments, a data set includes objects that are associated with a plurality of different locations. A data pool may include the data set, but be limited to one of the different locations. Objects included in the data set that are associated with other locations are excluded from the specified data pool. In this example, "San Francisco" is selected as the primary site location and "Mission Critical Billing" is selected as the data pool. The "Mission Critical Billing" data pool may include one or more objects that are not associated with "San Francisco." For example, an object may be located in a different data center, such as "New York." By specifying "San Francisco" as the primary site location and selecting "Mission Critical Billing" as a data set for the data pool, objects that are included in the data set, but associated with the different data center(s) would be excluded from the specified data pool.

FIG. 3E illustrates an example of a graphical user interface in accordance with some embodiments. In the example shown, graphical user interface 320 has received a selection of "Mission Critical Billing" as the data pool. As a result, data sets 323, 324, 326 may be automatically instantiated in graphical user interface item 316. In the example shown, a data set 323 named "Web Tier," (e.g., the data set created in FIGS. 2A-2I), a data set 324 named "Database Tier," and a data set 326 named "App Tier" are automatically instantiated in graphical user interface item 316.

In the example shown, the order in which a data management service is applied to the data pool is based on a top-down order. For example, a data management service is first applied to data set 323, subsequently applied to data set 324, and finally applied to data set 326. In other embodiments, the order in which a data management action is applied to a data pool is based on a bottom-up order. In some embodiments, the one or more data sets are analyzed to determine all of the objects included in the one or more data sets and the data management service is applied to the objects included in the one or more data sets independent of the object's membership in a data set.

FIG. 3F illustrates an example of a graphical user interface in accordance with some embodiments. In the example shown, graphical user interface 325 has received a re-ordering of data sets 323, 324, 326. In the sample shown, a data management action may be first applied to data set 324, subsequently applied to data set 326, and finally applied to data set 323.

FIG. 3G illustrates an example of a graphical user interface in accordance with some embodiments. In the example shown, graphical user interface 330 has received an instantiation of graphical user interface item 331. The instantiation of graphical user interface item 331 may occur when a user selects graphical user interface item 307 and performs a "drag and drop" operation with respect to graphical user interface 330. Graphical user interface item 331 includes a drop down menu 332 that enables a user to select a script to apply to data set 326. The script associated with graphical user interface item 331 is to be applied to the one or more objects associated with data set 326, but is not applied to the one or more objects associated with data sets 324, 323. A user may select a corresponding graphical user interface item 307 for data sets 324, 323. The selected scripts may be the same scripts or different scripts.

FIG. 3H illustrates an example of a graphical user interface in accordance with some embodiments. In the example shown, graphical user interface 335 has received a selection of drop down menu 332. In response to the selection, drop down menu 332 is expanded to include one or more scripts 336 that may be applied to data set 326. In some embodiments, the one or more scripts included in drop down menu 332 are specific to the data that is included in a data set. In some embodiments, the one or more scripts included in drop down menu 332 are scripts that may be applied to any data set. In the example shown, the one or more scripts included in the drop down menu are "PreFailover.bat" and "Tier3_VM.bat." In the example shown, graphical user interface 335 has received a selection 337 of "Tier3_VM.bat."

FIG. 3I illustrates an example of a graphical user interface in accordance with some embodiments. In the example shown, graphical user interface 340 has received an instantiation of graphical user interface item 341. The instantiation of graphical user interface item 341 may occur when a user selects graphical user interface item 306 and performs a "drag and drop" operation with respect to graphical user interface 340. Graphical user interface item 341 includes a field 342 that enables a user to specify a numerical number for a time delay and a drop down menu 343 that enables a user to specify a time unit for the delay (e.g., seconds, minutes, hours, days, weeks, months, etc.). In this example, the time delay associated with graphical user interface item 341 is to be applied to all of the data sets included in data pool 316.

FIG. 3J illustrates an example of a graphical user interface in accordance with some embodiments. In the example shown, graphical user interface 345 has received an instantiation of graphical user interface item 346. The instantiation of graphical user interface item 346 may occur when a user selects graphical user interface item 307 and performs a "drag and drop" operation with respect to graphical user interface 345. Graphical user interface item 346 includes a drop down menu 347 that enables a user to select a script that is to be applied to all of the data sets included in data pool 316.

FIG. 3K illustrates an example of a graphical user interface in accordance with some embodiments. In the example shown, graphical user interface 350 has received a selection of drop down menu 347. In response to the selection, drop down menu 347 is expanded to include one or more scripts 351 that may be applied to data pool 316. In some embodiments, the one or more scripts that may be applied are specific to the data sets included in a data pool. In some embodiments, the one or more scripts that may be applied are a list of available scripts that may be applied to any data set. In the example shown, the one or more script locations included in the drop down menu are "PreFailover.bat" and "Tier3_VM.bat." In the example shown, graphical user interface 350 has received a selection 352 of "PreFailover.bat" and the selected script is to be applied to all of the data sets included in data pool 316.

FIG. 3L illustrates an example of a graphical user interface in accordance with some embodiments. In the example shown, graphical user interface 355 has received an instantiation of graphical user interface item 356. The instantiation of graphical user interface item 356 may occur when a user selects graphical user interface item 308 and performs a "drag and drop" operation with respect to graphical user interface 355. Graphical user interface item 356 includes fields that enable a user to configure a data management service, such as disaster recovery. Graphical user interface item 356 may enable a user to specify a corresponding numerical number and a time unit (e.g., seconds, minutes, hours, days, weeks, months, etc.) for an RPO configuration and an RTO configuration. In the example shown, the user has specified an RPO setting to be less than 5 minutes and an RTO setting to be less than 5 minutes. Graphical user interface item 356 includes fields that enable a user to specify when the data management service is to begin. In the example shown, a user has specified that the data management service is to begin at 10:25 AM on Jul. 9, 2020.

FIG. 3M illustrates an example of a graphical user interface in accordance with some embodiments. In the example shown, graphical user interface 360 has received an instantiation of graphical user interface item 367. The instantiation of graphical user interface item 367 may occur when a user selects graphical user interface item 302 and performs a "drag and drop" operation with respect to graphical user interface 360.

Graphical user interface 360 may receive a selection of graphical user interface item 368. In response to the selection, graphical user interface 360 may establish a connection 366 between graphical user interface item 311 and graphical user interface item 367. Connection 366 may indicate a direction of data associated with the disaster recovery plan. For example, data is sent from the primary site to the disaster recovery site.

FIG. 3N illustrates an example of a graphical user interface in accordance with some embodiments. In the example shown, graphical user interface item 367 includes a drop down menu 371. Graphical user interface 365 has received a selection of drop down menu 371. In response to the selection, drop down menu 371 is expanded to include one or more locations 372. The one or more locations included in the drop down menu may correspond to the regions and/or locations of datacenters associated with an entity. In the example shown, the entity is associated with a first region "East Coast," a second region "Central," and a third region "West Coast." In the example shown, graphical user interface 365 has received a selection 373 of "Denver."

In some embodiments, one or more locations 372 included in drop down menu 371 may be unable to meet the requirements of a data management action. Graphical user interface 365 may make such locations unavailable for selection by graying out the location or removing the location from the one or more locations 371.

FIG. 3O illustrates an example of a graphical user interface in accordance with some embodiments. In the example shown, graphical user interface 370 has received an instantiation of graphical user interface item 376. The instantiation of graphical user interface item 376 may occur when a user selects graphical user interface item 304 and performs a "drag and drop" operation with respect to graphical user interface 370. Graphical user interface item 376 includes a drop down menu 377 that enables a user to specify a target type.

FIG. 3P illustrates an example of a graphical user interface in accordance with some embodiments. In the example shown, graphical user interface 375 has received a selection of drop down menu 377. In response to the selection, drop down menu 377 is expanded to include one or more target types 381. In the example shown, the one or more target types 381 are "vCenter" and "Cohesity Cluster." In the example shown, graphical user interface 375 has received a selection 382 of "vCenter."

FIG. 3Q illustrates an example of a graphical user interface in accordance with some embodiments. In the example shown, graphical user interface 380 has received a selection of drop down menu 371. In response to the selection, drop down menu 371 is expanded to include one or more target locations that match the target type selected in FIG. 3P. The one or more target locations may be target locations that are recommended based on a specified protection profile. For example, there may be other target locations at the disaster recover site, but are not shown by graphical user interface 380 because they are unlikely to meet the requirements of the specified protection profile. In the example shown, the one or more target locations 386 are "vCenter West 01," "vCenter West 02," and "vCenter West 03." In the example shown, graphical user interface 380 has received a selection 387 of "vCenter West 01."

FIG. 3R illustrates an example of a graphical user interface in accordance with some embodiments. Graphical user interface item 376 includes a plurality of fields, such as "Username," "Password," "Paired Cohesity," and "Resources Profile." In the example shown, graphical user interface item 385 has been updated to illustrate updated values for the plurality of fields.

FIG. 3S illustrates an example of a graphical user interface in accordance with some embodiments. In the example shown, graphical user interface 390 has received a selection of "validate" button 396. In response to the selection, a user device associated with graphical user interface 390 may send data associated with the specified data management plan for a data management service to a control plane that is part of a DMaaS infrastructure. The control plane includes a data management plan orchestrator.

In some embodiments, the data management plan orchestrator validates the specified data management plan for a data management service. In response to validating the specified data management plan, the data management plan orchestrator is configured to orchestrate the datacenter components needed to achieve the intent specified by graphical user interface 390.

In some embodiments, the data management plan orchestrator does not validate the specified data management plan for a data management service. For example, a user may specify a particular RPO or RTO that the target systems located at the disaster recovery site are able to achieve. In response to not validating the specified data management service, the data management plan orchestrator is configured to provide graphical user interface 390 a notification that the specified data management plan is unable or unlikely to be validated. In some embodiments, the notification includes one or more reasons indicating why the specified data management plan was unable or unlikely to be validated. In some embodiments, the notification includes one or more recommendations or modifications to the specified data management plan that may enable the specified data management plan to be validated. For example, the notification may include a recommendation to change the particular RPO or RTO to a value that the target systems located at the disaster recovery site are able to achieve.

Figure 4:
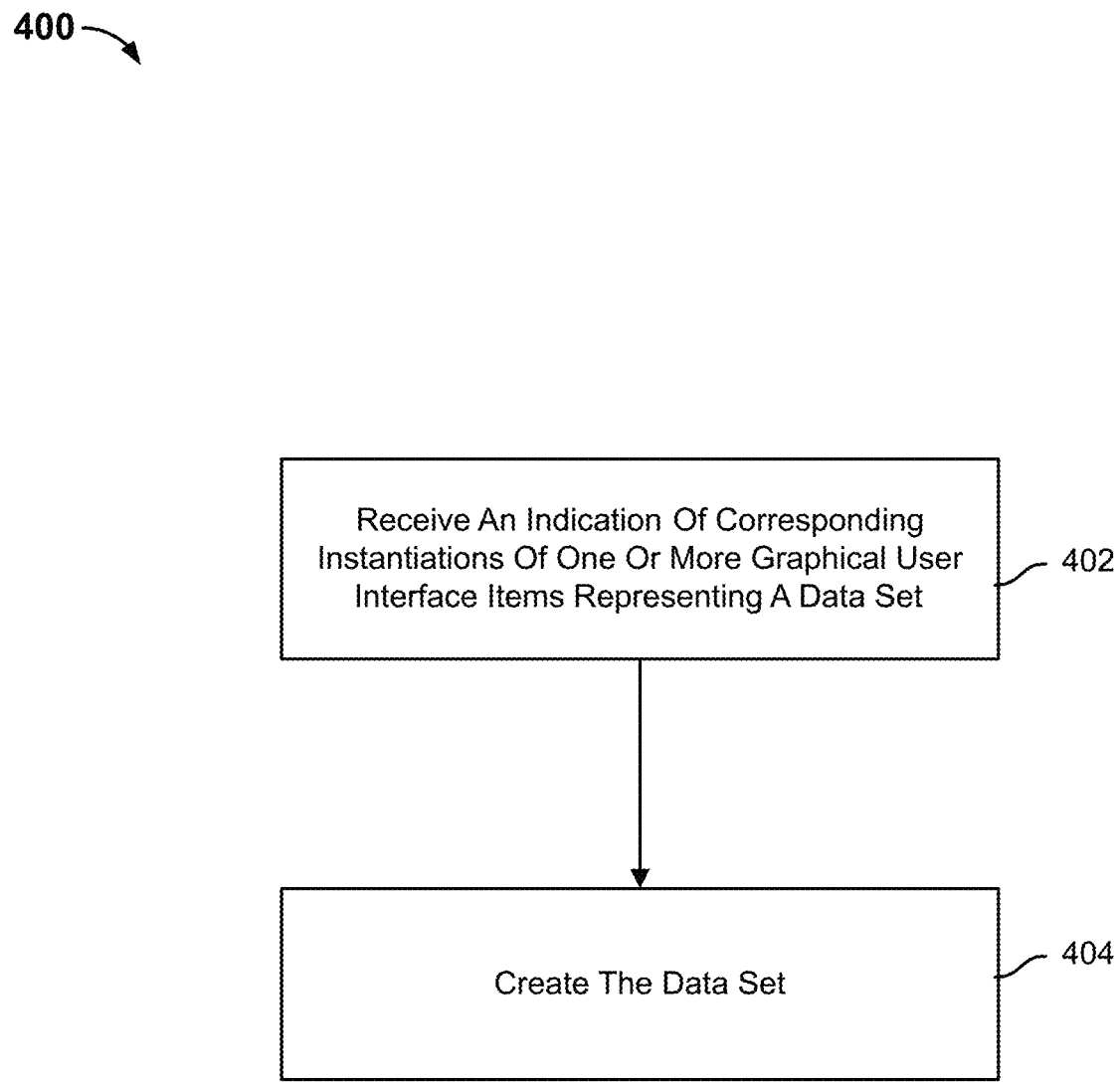
FIG. 4 is a flow diagram illustrating a process for specifying a data set in accordance with some embodiments.

FIG. 4 is a flow diagram illustrating a process for specifying a data set in accordance with some embodiments. In the example shown, process 400 may be implemented by a graphical user interface, such as graphical user interface 103.

At 402, an indication of corresponding instantiations of one or more graphical user interface items representing a data set is received. A graphical user interface may enable the user to specify one or more objects to be included in a data set by providing a plurality of building blocks. The graphical user interface provides a flexible approach to add one or more objects to a data set without having to explicitly identify, (e.g., by name), the one or more objects to be included in the data set.

A data pool includes one or more data sets. A data set is comprised of one or more objects. The graphical user interface may enable a user to graphically specify which objects are to be included in the data set through the use of one or more of the building blocks.

The plurality of building blocks for specifying a data set may include a graphical user interface item that represents a data set. The graphical user interface item may enable the user to name the data set.

The plurality of building blocks for specifying a data set may include a graphical user interface item that specifies a location associated with objects to be included in the data set. Objects that are not associated with the specified location may be excluded from the data set. The graphical user interface item that specifies the location associated with objects to be included in the data set may be graphically connected to the graphical user interface item that represents the data set. This indicates that objects included in the data set are associated with the specified location.

The plurality of building blocks for specifying a data set may include a graphical user interface item that specifies a data source for objects to be included in the data set. The objects that are included in the data set may be limited based on a data type associated with the object. For example, the data set may be limited to VMs and exclude objects of other data types (e.g., databases). The graphical user interface item that specifies a data source for objects to be included in the data set may be graphically connected to the graphical user interface item that represents the data set. This indicates that objects included in the data set are associated with the specified data source.

The plurality of building blocks for specifying a data set may include a graphical user interface item that manually selects objects to be included in the data set. The graphical user interface provides a flexible approach to add one or more objects to a data set without having to explicitly identify, (e.g., by name), the one or more objects to be included in the data set. However, the graphical user interface provides a user the ability to include one or more objects by name. The graphical user interface item that manually selects objects to be included in the data set may be graphically connected to the graphical user interface item that represents the data set. This explicitly identifies objects that are included in the data set.

The plurality of building blocks for specifying a data set may include a graphical user interface item that specifies objects to be included in the data set by a tag, a label, and/or a prefix. For example, a user may specify that objects with a particular tag are included in the dataset. The graphical user interface item that specifies objects to be included in the data set by a tag, a label, file extension, and/or a prefix may be graphically connected to the graphical user interface item that represents the data set. This indicates that objects included in the data set have a particular tag, a particular label, a particular file extension, and/or a particular prefix.

The plurality of building blocks for specifying a data set may include a graphical user interface item that specifies a rule for adding objects to the data set. For example, a user may specify a rule that objects included in the data set may not be transmitted outside a particular region. A disaster recovery plan may be established for a datacenter located in the United Kingdom. An entity may have a datacenter located in New York and Germany. The rule may indicate that objects located in the data set may not be transmitted outside of Europe. Thus, the datacenter located in Germany may be selected as a disaster recovery site while the data center located in New York may not be selected as a disaster recovery site. The graphical user interface item that specifies a rule for adding objects to the data set may be graphically connected to the graphical user interface item that represents the data set. This indicates that a particular rule is used to add objects to the data set.

The plurality of building blocks for specifying a data set may include a graphical user interface item that adds a rule operator for the data set. For example, a user may specify that objects created before a particular date are excluded from the data set. The graphical user interface item that adds a rule operator for the data set may be graphically connected to the graphical user interface item that represents the data set. This indicates that a particular rule applies to the objects included in the data set.

At 404, the data set is created. Upon creation, the data set may be included in a data pool for an intent-based data management plan.

Figure 5:
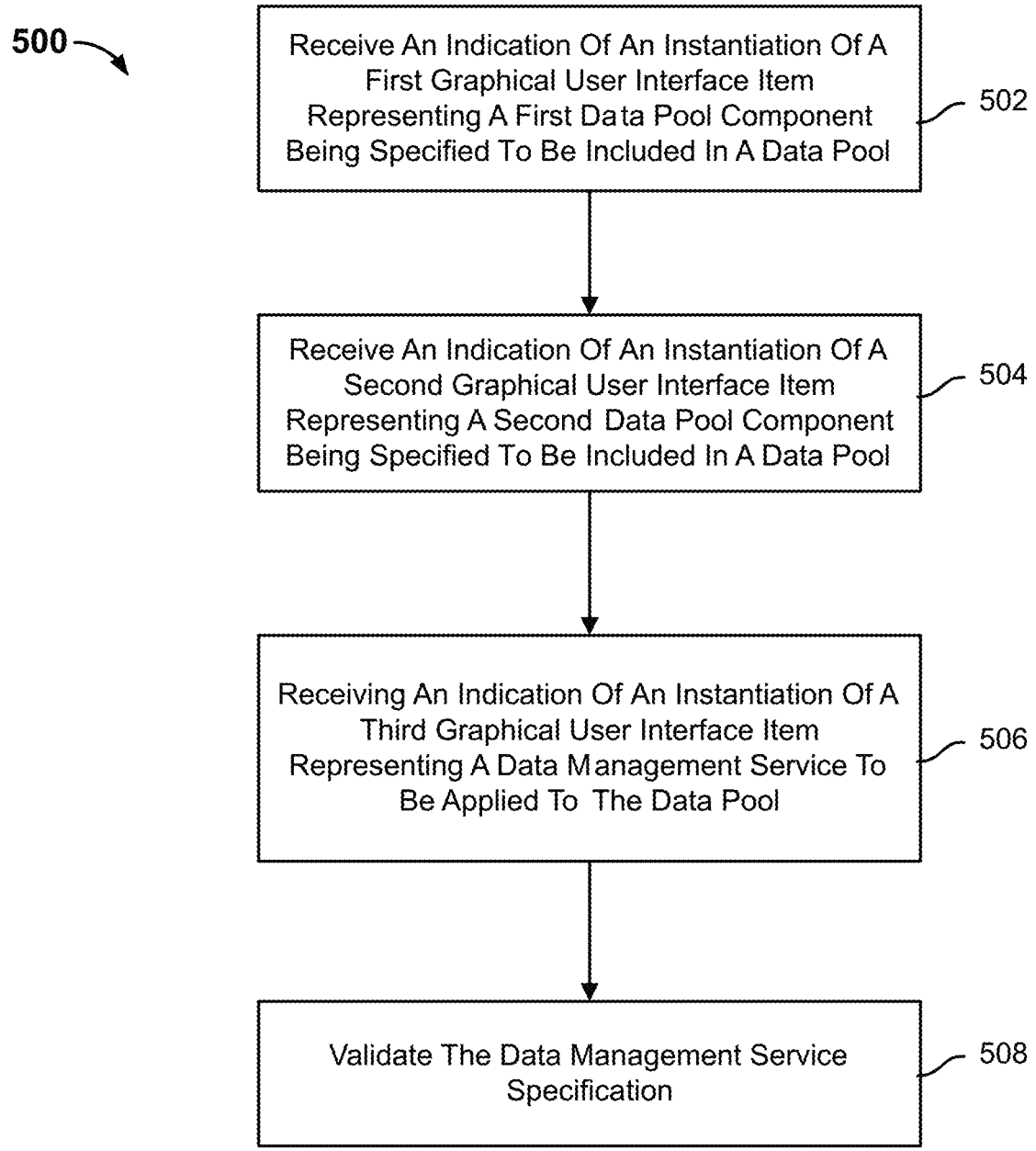
FIG. 5 is a flow diagram illustrating a process for specifying a data management service in accordance with some embodiments.

FIG. 5 is a flow diagram illustrating a process for specifying a data management service in accordance with some embodiments. In the example shown, process 500 may be implemented by a graphical user interface, such as graphical user interface 103. A data management service may be backup, restore, disaster recovery, replication, migration, analytics, compliance, security, etc.

At 502, an indication of an instantiation of a first graphical user interface item representing a first data pool component being specified to be included in a data pool is received. A graphical user interface may provide a plurality of building blocks that enable a user to specify a data management service. Some of the plurality of building blocks may be referred to as data pool components. The graphical user interface may enable a user to perform a series of "drag and drop" operations to instantiate one or more graphical user interface items and specify a data pool and a data management service that is to be applied to the data pool. The graphical user interface may include a selection of one of the building blocks.

The plurality of building blocks may include a graphical user interface item that enables a user to specify a primary site associated with a data management service. A primary site may correspond to a datacenter location associated with an entity.

The plurality of building blocks may include a graphical user interface item that enables a user to specify, if needed, a disaster recovery site associated with the data management service. The disaster recovery site may correspond to a datacenter associated with the entity that is different than the specified primary site.

The plurality of building blocks may include a graphical user interface item that enables a user to specify a data pool to which the data management service is to be applied. The data pool is comprised of one or more data sets. In the event the user adds a plurality of data sets to the data pool, the order in which the data management service is to be applied is based on a top-down order. In some embodiments, the order in which the data management service is to be applied is based on a bottom-up order. In some embodiments, the one or more data sets are analyzed to determine all of the objects included in the one or more data sets and the data management service is applied to the objects included in the one or more data sets independent of the object's membership in a data set.

The plurality of building blocks may include a graphical user interface item that enables a user to specify a target center associated with the data management service. The target center may correspond to a server or virtual machine that is to receive data associated with one or more objects stored at the primary site. For example, the target center may correspond to a server or virtual machine that is to be used for restoration, migration, replication, continuous data protection, etc.

The plurality of building blocks may include a graphical user interface item that enables a user to specify a time delay associated with the data management service. The time delay may indicate an amount of time after the intent-based data management plan is validated before the data management service is performed.

The plurality of building blocks may include a graphical user interface item that enables a user to specify a script associated with the data management service.

At 504, an indication of an instantiation of a second graphical user interface item representing a second data pool component being specified to be included in the data pool is received. The second graphical user interface item may be graphically instantiated as connected with the first graphical user interface item to indicate that the first data pool component and the second data pool component belong to the same data pool able to be referenced as a combined single data entity. The second graphical user interface item may correspond to one of the plurality of building blocks provided by the graphical user interface.

At 506, an indication of an instantiation of a third graphical user interface item representing a data management service to be applied to the data pool is received. The instantiation of a graphical user interface item may occur when a user selects the third graphical user interface item and performs a "drag and drop" operation with respect to the graphical user interface. The third graphical user interface item is graphically instantiated as connected with a graphical representation of the data pool. This indicates that the data management service is to be applied to the data pool.

A specification of the data management service may be specified through the use of the building blocks provided by the graphical user interface. The plurality of building blocks may include a graphical user interface item that enables a user to specify a protection profile associated with the data management service. The protection profile may indicate an RTO and/or an RPO associated with objects included in the specified data pool. The protection profile may indicate a frequency at which backups (e.g., continuous, hourly, daily, weekly, etc.) are to be performed for objects included in the specified data pool. The protection profile may indicate a type of backup (e.g., full backup, incremental backup, or CDP) that is to be performed for objects included in the specified data pool. The protection profile may indicate a frequency (e.g., one time, daily, weekly, etc.) at which a virus scan is performed on objects included in the specified data pool. The protection profile may indicate a storage tier for objects included in the specified data pool.

At 508, the data management service specification is validated. The data management service specification may include one or more data management plans corresponding to one or more data management services.

The graphical user interface may include a graphical user interface item that enables a user to validate the combination of building blocks that specify the data pool and a data management plan for the data management service. In response to a selection of the graphical user interface item, a user device associated with the graphical user interface may send data associated with the specified data pool and the specified data management plan for the data management service to a control plane that is part of a DMaaS infrastructure.

The control plane may include a data management plan orchestrator. In some embodiments, the data management plan orchestrator validates the specified data pool and the specified data management plan for the data management service. The data management plan orchestrator may validate the specified data management plan by performing at least one of determining whether the inputs associated with the specified data management plan are correct, determining if the network resources needed to implement the specified data management plan are sufficient, determining whether a specified resource (e.g., disaster recovery site system) needed to perform some or all of the data management plan is capable of performing as required by the specified data management plan (e.g., has enough storage, system resources, etc.), determining whether a service level agreement is able to be achieved (e.g., able to achieve a specified RPO and/or RTO), identifying the one or more datacenter components that are needed to achieve the intent, etc.

In response to validating the specified data pool and the specified data management plan, the data management plan orchestrator is configured to orchestrate the datacenter components that are needed to achieve the intent (e.g., perform the data management service) by sending one or more commands to the one or more identified datacenter components to achieve the intent.

In some embodiments, the data management plan orchestrator does not validate the specified data pool and the data management plan. For example, a user may specify a particular RPO or RTO that the datacenter components are able to achieve. In response to not validating the specified data pool and the specified data management service, the data management plan orchestrator is configured to provide the graphical user interface of the user device a notification that the specified data management plan is unable or unlikely to be validated. In some embodiments, the notification includes one or more reasons indicating why the specified data management plan was unable or unlikely to be validated. In some embodiments, the notification includes one or more recommendations or modifications to the specified data management plan that may enable the specified data management plan to be validated. For example, the notification may include a recommendation to change the particular RPO or RTO to a value that the datacenter components are able to achieve.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, in a graphical user interface associated with a client device, a first indication of a first instantiation of a first graphical user interface item, wherein the first graphical user interface item represents a first data pool component being specified to be included in a data pool, wherein the first data pool component identifies a first data set of one or more objects to which a data management service applies, wherein the one or more objects included in the first data set to which the data management service applies are identified by a first set of one or more of tags, labels, features, and/or prefixes;
    receiving, in the graphical user interface associated with the client device, a second indication of a second instantiation of a second graphical user interface item, wherein the second graphical user interface item represents a second data pool component being specified to be included in the data pool, wherein the second data pool component identifies a second data set of one or more objects to which the data management service applies, wherein the one or more objects included in the second data set to which the data management service applies are identified by a second set of one or more of tags, labels, features, and/or prefixes wherein the second graphical user interface item is graphically instantiated in the graphical user interface associated with the client device as connected with the first graphical user interface item to indicate that the first data pool component and the second data pool component belong to the data pool;
    receiving, in the graphical user interface associated with the client device, a third indication of a third instantiation of a third graphical user interface item, wherein the third graphical user interface item represents the data management service to be applied to the data pool, wherein the third graphical user interface item is graphically instantiated in the graphical user interface associated with the client device as connected with a graphical representation of the data pool that includes the first graphical user interface item and the second graphical user interface item, wherein the third graphical user interface item specifies a protection profile associated with the data management service that at least includes a recovery point objective and/or a recovery time objective for a first plurality of objects to be included in the data pool;
    analyzing the first data set of the one or more objects and the second data set of the one or more objects to determine the first plurality of objects to be included in the data pool, wherein the first plurality of objects determined to be included in the data pool include the first set of one or more of the tags, the labels, the features and/or the prefixes and the second set of one or more of the tags, the labels, the features, and/or the prefixes;
    receiving, in the graphical user interface associated with the client device, a selection of a validation graphical user interface item; and
    in response to receiving the selection of the validation graphical user interface item, validating the data pool and the data management service at least in part by providing, to a data management plan orchestrator that is remote from the client device, data associated with the data pool and a data management plan that includes the protection profile associated with the data management service, wherein the data management plan orchestrator is configured to validate the data pool and the data management service in response to a determination that resources needed to perform the data management service as indicated by the protection profile with respect to the first plurality of objects included in the data pool are available.

2. The method of claim 1, wherein the data management plan orchestrator orchestrates one or more datacenter components to perform the data management service in response to validating the data management service.

3. The method of claim 1, further comprising receiving a validation indication that the data management plan orchestrator did not validate the data management plan for the data management service.

4. The method of claim 3, wherein the validation indication includes one or more recommendations to modify the data management plan.

5. The method of claim 1, wherein the data management service corresponds to one of backup, restore, disaster recovery, replication, migration, file tiering, security, compliance, or analytics.

6. The method of claim 1, wherein the first graphical user interface item representing the first data pool component indicates a datacenter location.

7. The method of claim 1, further comprising receiving a fourth indication of a fourth instantiation of a fourth graphical user interface item representing a third data pool component being specified to be included in the data pool, wherein the fourth graphical user interface item representing the third data pool component specifies a target center associated with the data management service.

8. The method of claim 1, further comprising receiving a fourth indication of a fourth instantiation of a fourth graphical user interface item representing a third data pool component being specified to be included in the data pool, wherein the fourth graphical user interface item representing the third data pool component specifies a time delay associated with the data management service.

9. The method of claim 1, further comprising receiving a fourth indication of a fourth instantiation of a fourth graphical user interface item representing a third data pool component being specified to be included in the data pool, wherein the fourth graphical user interface item representing the third data pool component specifies a script associated with the data management service.

10. The method of claim 1, wherein the first data set of the one or more objects is specified at least in part by:
receiving a fourth indication of a fourth instantiation of a fourth graphical user interface item representing a first data set component being specified to be included in the first data set; and
receiving a fifth indication of a fifth instantiation of a fifth graphical user interface item representing a second data set component being specified to be included in the first data set, wherein the fourth graphical user interface item representing the first data set component and the fifth graphical user interface item representing the second data set component are graphically instantiated as connected in the graphical user interface to represent the first data set.

11. The method of claim 10, wherein the fourth graphical user interface item representing the first data set component specifies a location associated with objects to be included in the data set.

12. The method of claim 10, wherein the fifth graphical user interface item representing the second data set component specifies a data source associated with objects to be included in the data set.

13. The method of claim 10, wherein the fifth graphical user interface item representing the second data set component specifies a first tag, a first label, or a first feature, or a first prefix associated with objects to be included in the first data set of the one or more objects.

14. The method of claim 10, wherein the fifth graphical user interface item representing the second data set component specifies a rule for adding objects to the data set.

15. A computer program product embodied in a non-transitory computer readable medium and comprising computer instructions for:
receiving, in a graphical user interface associated with a client device, a first indication of a first instantiation of a first graphical user interface item, wherein the first graphical user interface item represents a first data pool component being specified to be included in a data pool, wherein the first data pool component identifies a first data set of one or more objects to which a data management service applies, wherein the one or more objects included in the first data set to which the data management service applies are identified by a first set of one or more of tags, labels, features, and/or prefixes;
receiving, in the graphical user interface associated with the client device, a second indication of a second instantiation of a second graphical user interface item, wherein the second graphical user interface item represents a second data pool component being specified to be included in the data pool, wherein the second data pool component identifies a second data set of one or more objects to which the data management service applies, wherein the one or more objects included in the second data set to which the data management service applies are identified by a second set of one or more of tags, labels, features, and/or prefixes, wherein the second graphical user interface item is graphically instantiated in the graphical user interface associated with the client device as connected with the first graphical user interface item to indicate that the first data pool component and the second data pool component belong to the data pool;
receiving, in the graphical user interface associated with the client device, a third indication of a third instantiation of a third graphical user interface item, wherein the third graphical user interface item represents the data management service to be applied to the data pool, wherein the third graphical user interface item is graphically instantiated in the graphical user interface associated with the client device as connected with a graphical representation of the data pool that includes the first graphical user interface item and the second graphical user interface item, wherein the third graphical user interface item specifies a protection profile associated with the data management service that at least includes a recovery point objective and/or a recovery time objective for a first plurality of objects to be included in the data pool;
analyzing the first data set of the one or more objects and the second data set of the one or more objects to determine the first plurality of objects to be included in the data pool, wherein the first plurality of objects determined to be included in the data pool include the first set of one or more of the tags, the labels, the features and/or the prefixes and the second set of one or more of the tags, the labels, the features, and/or the prefixes;
receiving, in the graphical user interface associated with the client device, a selection of a validation graphical user interface item; and
in response to receiving the selection of the validation graphical user interface item, validating the data pool and the data management service at least in part by providing, to a data management plan orchestrator that is remote from the client device, data associated with the data pool and information associated with the protection profile associated with the data management service, wherein the data management plan orchestrator validates the data pool and the data management service in response to a determination that resources needed to perform the data management service as indicated by the protection profile with respect to the first plurality of objects included in the data pool are available.

16. A system, comprising:
a processor configured to:
- receive, in a graphical user interface associated with a client device, a first indication of a first instantiation of a first graphical user interface item, wherein the first graphical user interface item represents a first data pool component being specified to be included in a data pool, wherein the first data pool component identifies a first data set of one or more objects to which a data management service applies, wherein the one or more objects included in the first data set to which the data management service applies are identified by a first set of one or more of tags, labels, features, and/or prefixes;
- receive, in the graphical user interface associated with the client device, a second indication of a second instantiation of a second graphical user interface item, wherein the second graphical user interface item represents a second data pool component being specified to be included in the data pool, wherein the second data pool component identifies a second data set of one or more objects to which the data management service applies, wherein the one or more objects included in the second data set to which the data management service applies are identified by a second set of one or more of tags, labels, features, and/or prefixes, wherein the second graphical user interface item is graphically instantiated in the graphical user interface associated with the client device as connected with the first graphical user interface item to indicate that the first data pool component and the second data pool component belong to the data pool; and
- receive, in the graphical user interface associated with the client device, a third indication of a third instantiation of a third graphical user interface item, wherein the third graphical user interface item represents the data management service to be applied to the data pool, wherein the third graphical user interface item is graphically instantiated in the graphical user interface associated with the client device as connected with a graphical representation of the data pool that includes the first graphical user interface item and the second graphical user interface item, wherein the third graphical user interface item specifies a protection profile associated with the data management service that at least includes a recovery point objective and/or a recovery time objective for a first plurality of objects to be included in the data pool;
- analyze the first data set of the one or more objects and the second data set of the one or more objects to determine the first plurality of objects to be included in the data pool, wherein the first plurality of objects determined to be included in the data pool include the first set of one or more of the tags, the labels, the features and/or the prefixes and the second set of one or more of the tags, the labels, the features, and/or the prefixes;
- receive, in the graphical user interface associated with the client device, a selection of a validation graphical user interface item; and
- in response to receiving the selection of the validation graphical user interface item, validating the data pool and the data management service at least in part by providing, to a data management plan orchestrator that is remote from the client device, data associated with the data pool and information associated with the protection profile associated with the data management service, wherein the data management plan orchestrator validates the data pool and the data management service in response to a determination that resources needed to perform the data management service as indicated by the protection profile with respect to the first plurality of objects included in the data pool are available; and a memory coupled to the processor and configured to provide the processor with instructions.

* * * * *